(12) United States Patent
Nishita et al.

(10) Patent No.: US 6,173,285 B1
(45) Date of Patent: Jan. 9, 2001

(54) INFORMATION PROCESSING APPARATUS WITH BOOKMARK FUNCTION

(75) Inventors: Taizo Nishita, Ikoma; Shingo Nakahara, Tsuzuki-gun; Kazunori Ikeda, Yawata, all of (JP)

(73) Assignee: Sharp Kabushiki Kaisha, Osaka (JP)

( * ) Notice: Under 35 U.S.C. 154(b), the term of this patent shall be extended for 0 days.

(21) Appl. No.: 09/108,281

(22) Filed: Jul. 1, 1998

(30) Foreign Application Priority Data

Jul. 8, 1997 (JP) .................................................. 9-182252

(51) Int. Cl.$^7$ ....................................................... G06F 3/00
(52) U.S. Cl. ................................. 707/10; 707/3; 707/7; 707/101; 707/102
(58) Field of Search ........................ 707/1, 7, 10, 3, 707/501, 102, 2; 345/335; 709/245; 395/761

(56) References Cited

U.S. PATENT DOCUMENTS

| | | | |
|---|---|---|---|
| 5,787,295 | * 8/1998 | Nakao | 395/761 |
| 5,926,807 | * 7/1999 | Peltonen et al. | 707/3 |
| 5,963,964 | * 10/1999 | Nielsen | 707/501 |
| 6,032,162 | * 3/2000 | Burke | 707/501 |
| 6,037,934 | * 3/2000 | Himmel et al. | 345/335 |
| 6,041,360 | * 3/2000 | Himmel et al. | 709/245 |

FOREIGN PATENT DOCUMENTS

| | | |
|---|---|---|
| 05101038A | 4/1993 | (JP) . |
| 06231186A | 8/1994 | (JP) . |

* cited by examiner

Primary Examiner—Thomas G. Black
Assistant Examiner—Thuy Do
(74) Attorney, Agent, or Firm—Nixon & Vanderhye P.C.

(57) ABSTRACT

An information processing apparatus with a bookmark function includes a memory, a display section, and a CPU for placing a bookmark in data, which are stored in the memory in a plurality of modes, respectively, storing specific information for specifying data marked with the bookmark in the memory, retrieving the stored data with the bookmark based on the specific information, and displaying the retrieved data in the display section. When the stored data marked with the bookmark is retrieved based on the specific information, the CPU controls the display section to display the retrieved data and a mode to which the retrieved data belongs. This structure enables the user to use the apparatus more conveniently.

21 Claims, 24 Drawing Sheets

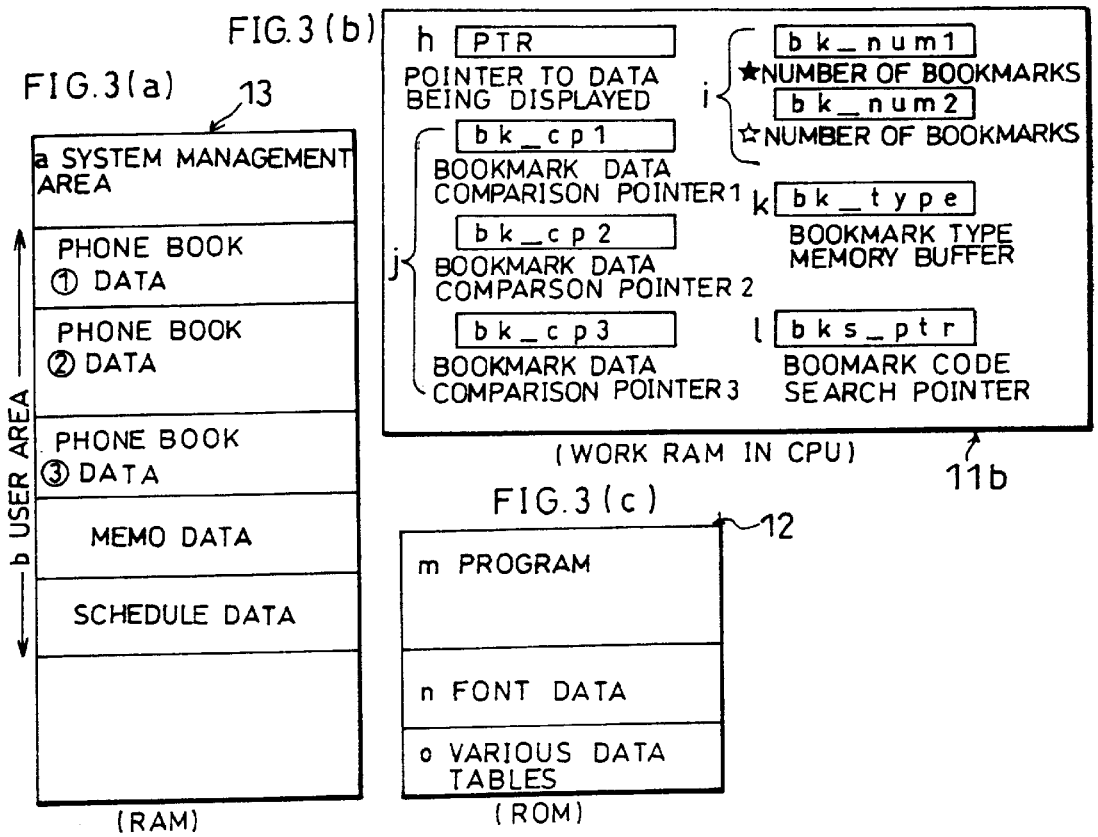

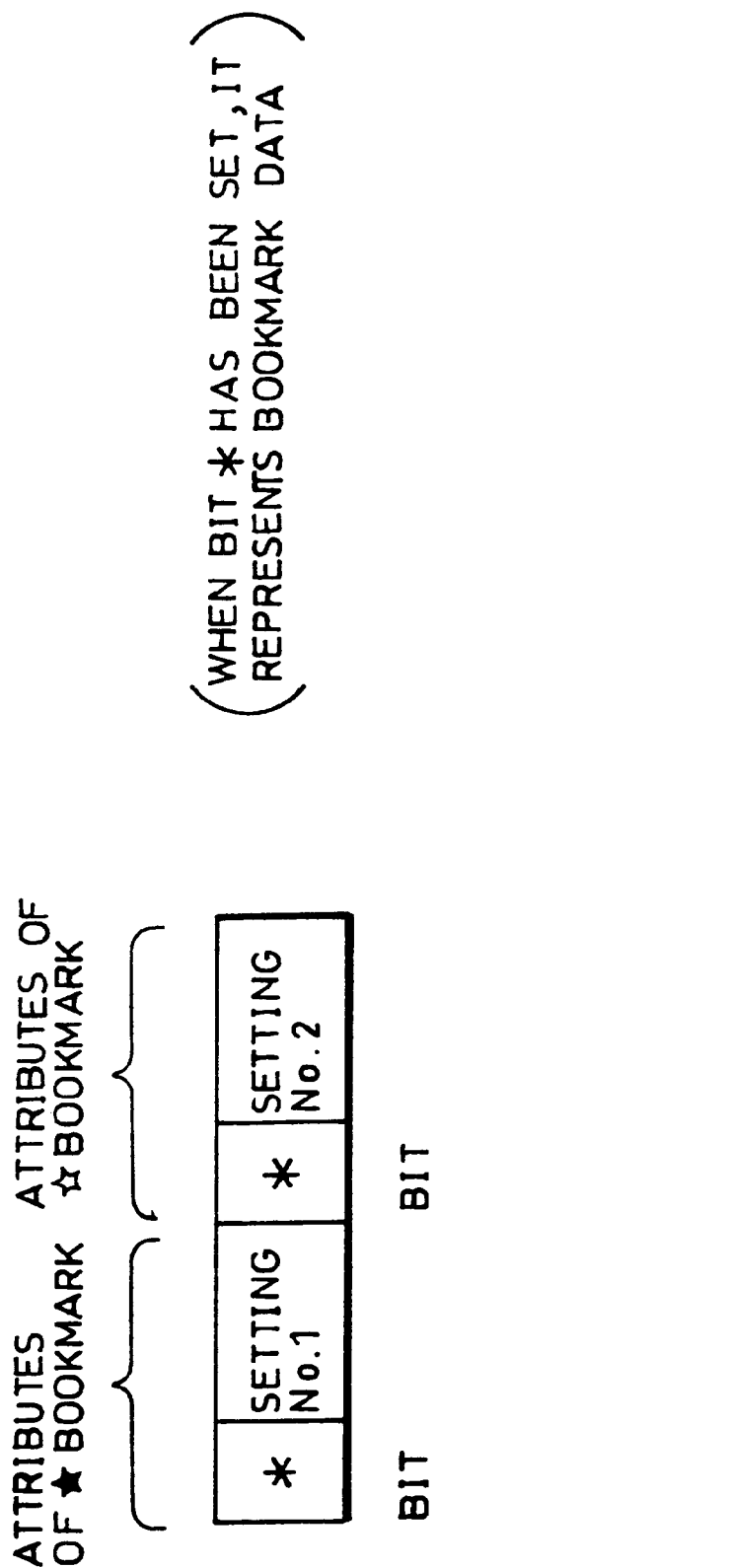

FIG.5(a)

| HEADER | DATA LENGTH | DATA ATTRIBUTES | NISHIDA TAIZO | DELIMITER CODE | bkmcd 1 → ● 0 7 4 3 5 — 1 |
|---|---|---|---|---|---|
| e-1 | e-2 | e-3 | e-4 | e-7 | e-5 |

FIG.5(b)

bkmcd 2 →  — 2 2 3 ◎ F A X 4 4 5 5 | DELIMITER CODE | bkmcd 1 → ● 123 MINATO-KU,TOKYO e-7    e-6

FIG. 6 kd1  kd2

| CODE | SETTING No. |

(CODE DISTINGUISHES A BOOKMARK AND TYPE OF THE BOOMARK)

FIG.7

| | KEY ENTRY | DISPLAY |
|---|---|---|
| S1 | [ON]<br>[PHONE] | PHONE BOOK1:NAME ? |
| S2 | V | A A A<br>1 1 1 - 1 1 1 1<br>1-1 MINATO-KU, TOKYO |
| S3 | V | B B B<br>2 2 2 - 2 2 2 2<br>2-2 SEIKA-CHO, KYOTO |
| S4 | V | C C C<br>3 3 3 - 3 3 3 3<br>3-3 SUMIYOSHI-KU, OSAKA |
| S5 | V ··· V | Z Z Z<br>4 4 4 - 4 4 4 4<br>4-4 HAKATA-SHI, FUKUOKA |

FIG.8

| | KEY ENTRY | DISPLAY |
|---|---|---|
| S6 | ∨ | PHONE BOOK1:NAME ? |
| S7 | ∨ ∨ | B B B<br>2 2 2 − 2 2 2 2<br>2-2 SEIKA-CHO,KYOTO |
| S8 | PLACE★ | ★1　B B B<br>2 2 2 − 2 2 2 2<br>2-2 SEIKA-CHO,KYOTO |
| S9 | DELETE★ | B B B<br>2 2 2 − 2 2 2 2<br>2-2 SEIKA-CHO,KYOTO |
| S10 | PLACE★ | ★1　B B B<br>2 2 2 − 2 2 2 2<br>2-2 SEIKA-CHO,KYOTO |

FIG.9

| | KEY ENTRY | DISPLAY | |
|---|---|---|---|
| S11 | ∨<br><br>PLACE★ | ★2 | C C C<br>3 3 3 - 3 3 3 3<br>3-3 SUMIYOSHI-KU, OSAKA |
| S12 | ∨ ·· ∨ PLACE★<br>.<br>∨ ·· ∨ PLACE★ | ★10 | N a n c y<br>1 2 3 - 4 5 6 7<br>1 5 . N o r t h   s t r |
| S13 | ∨ | | P e t e r<br>F A X   N o .   8 - 9 0<br>1 2 - 3 4 5 6 |
| S14 | PLACE★<br>(THE RIGHT<br>MESSAGE IS<br>DISPLAYED FOR<br>ABOUT 1 SECOND) | | ■   B O O K M A R K   ■<br>■   F I L E   I S   ■<br>■     F U L L   !   ■ |
| S15 | | | P e t e r<br>F A X   N o .   8 - 9 0<br>1 2 - 3 4 5 6 |

FIG.10

| | KEY ENTRY | DISPLAY | |
|---|---|---|---|
| S16 | FUNCTION<br>PLACE★ | ☆1 | P e t e r<br>F A X   N o .   8 - 9 0<br>1 2 - 3 4 5 6 |
| S17 | ∧<br>DELETE★ | | N a n c y<br>1 2 3 - 4 5 6 7<br>1 5 .  N o r t h   s t r |
| S18 | ∨ | ☆1 | P e t e r<br>F A X   N o .   8 - 9 0<br>1 2 - 3 4 5 6 |
| S19 | PLACE★ | ★10<br>☆1 | P e t e r<br>F A X   N o .   8 - 9 0<br>1 2 - 3 4 5 6 |
| S20 | BOOKMARK | | [ SPECIFY A MARK ]<br>  1 → SEARCH FOR ★ MARK<br>  2 → SEARCH FOR ☆ MARK |

FIG. 11

| | KEY ENTRY | DISPLAY |
|---|---|---|
| S21 | 1 | ★1 B B B<br>2 2 2 — 2 2 2 2<br>2-2 SEIKA-CHO, KYOTO<br>[SEARCH FOR THE BOOKMARK IS IN PROGRESS] [THIS DATA IS DATA OF PHONE BOOK ①] |
| S22 | ∨ | ★2 C C C<br>3 3 3 — 3 3 3 3<br>3-3 SUMIYOSHI-KU, OSAKA<br>[SEARCH FOR THE BOOKMARK IS IN PROGRESS] [THIS DATA IS DATA OF PHONE BOOK ①] |
| S23 | ∨ | ★3 D a v i s   M i k e<br>4 4 4 — 5 5 5 5<br>N o r t h   s t r e e t<br>[SEARCH FOR THE BOOKMARK IS IN PROGRESS] [THIS DATA IS DATA OF PHONE BOOK ③] |
| S24 | ∨ | ★4 E L V I S   P R E S R Y<br>6 7 8 — 5 4 3 2<br>S o u t h   s t r e e t<br>[SEARCH FOR THE BOOKMARK IS IN PROGRESS] [THIS DATA IS DATA OF PHONE BOOK ②] |
| S25 | WHEN THE BOOKMARK DATA HAS NOT BEEN SET S21, THE RIGHT MESSAGE IS DISPLAYED FOR ABOUT 1 SECOND | ■ B O O K M A R K ■<br>■ D A T A   N O T ■<br>■ F O U N D   ! ■ |

FIG.12

| | KEY ENTRY | DISPLAY |
|---|---|---|
| S26 | SPECIAL FUNCTION | ① AMOUNT OF MEMORY USED<br>② ADJUST DISPLAY DENSITY<br>③ DELETE DATA |
| S27 | 3 | DELETE DATA<br>① DELETE MODE<br>② BOOKMARK |
| S28 | 2 | [SPECIFY A MARK]<br>1→DELETE DATA MARKED WITH ★<br>2→DELETE DATA MARKED WITH ☆ |
| S29 | 1 | [DELETE DATA MARKED WITH A SPECIFIED MARK]<br>DELETION OF DATA MARKED WITH ★<br>BOOKMARK IS IN PROGRESS |
| S30 | | [DELETE DATA MARKED WITH A SPECIFID MARK]<br>DELETION OF DATA MARKED WITH ★<br>BOOKMARK IS COMPLETE |

FIG.13

| | KEY ENTRY | DISPLAY | |
|---|---|---|---|
| S31 | MEMO<br>∨ | ↓ | GUIDE TO PARTY<br>[DATE]    MAY 5, 1997<br>[PLACE] MINOSHOCHO,<br>          YAMATOKORIYAMA, NARA |
| S32 | ▼ | ↑<br><br>↓ | [MAP]      R24<br>R25 ─────┼─┼────<br>            │ │<br>            ■ ←HERE |
| S33 | PLACE★ | ↑<br>★2<br>↓ | [MAP]      R24<br>R25 ─────┼─┼────<br>            │ │<br>            ■ ←HERE |
| S34 | ▼ | ↑ | [THINGS TO BE BROUGHT]<br>. TOILETRIES<br>. SPORT WEAR<br>. COPY OF HEALTH INSURANCE CARD |
| S35 | FUNCTION<br>PLACE★ | ↑<br>☆1 | [THINGS TO BE BROUGHT]<br>. TOILETRIES<br>. SPORT WEAR<br>. COPY OF HEALTH INSURANCE CARD |
| S36 | BOOKMARK | | [SPECIFY A MARK]<br>1→SEARCH FOR ★ MARK<br>2→SEARCH FOR ☆ MARK |

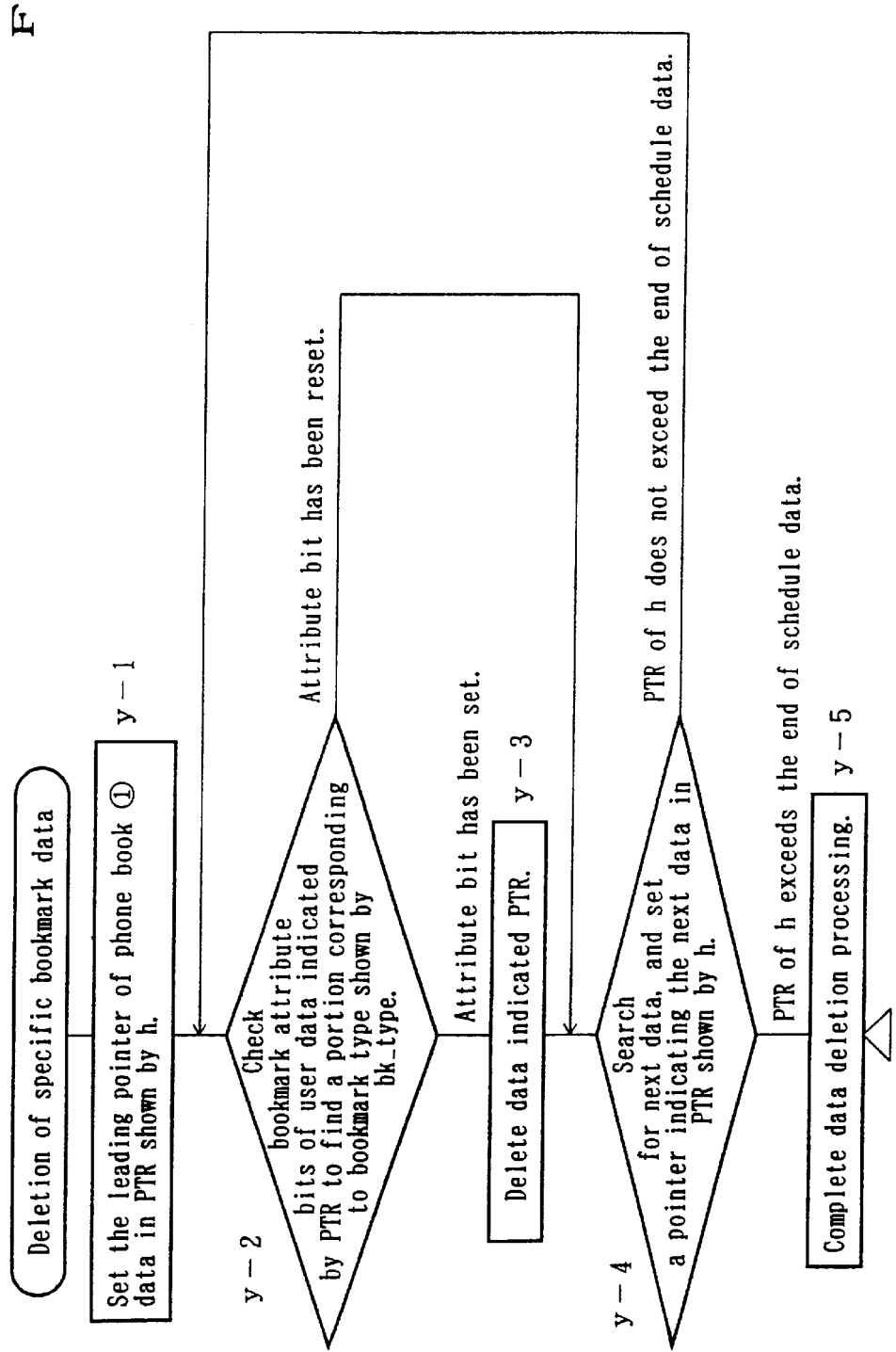

INFORMATION PROCESSING APPARATUS WITH BOOKMARK FUNCTION

FIELD OF THE INVENTION

The present invention relates to an information processing apparatus with bookmark function which allows a user to freely place a bookmark, for example, in data of high frequency in use and then to search for the data marked with the bookmark.

BACKGROUND OF THE INVENTION

Conventional portable electronic devices such as electronic memo device and electronic pocket device allow a user to freely input and store data, and to search for the stored data in a desired order. For example, when the stored data are data of phone book, it is possible to search for the data in order of Japanese kana syllabary, alphabetical order, etc.

Other methods for searching data are, for example, schedule data search, first letter search, and keyword search.

There is a device having a bookmark function for searching purposes. Japanese publication of unexamined patent application (Tokukaihei) No. 5-101038 discloses a word processor having such a bookmark function.

This device is a word processor provided with a bookmark function for adding a mark or memo to a created document, and a bookmark edit function for searching for a bookmark. This device achieves laborsaving in creating a document, and improves the accuracy of proofreading a document.

Besides, regarding display devices such as a document processor with a driving device for manipulating document information, Japanese publication of unexamined patent application (Tokukaihei) No. 6-231186 discloses a display device that displays a state showing a visually recognizable mark, for example, bookmark, for reference.

However, with the above-mentioned conventional structure, in a portable electronic device having a plurality of modes, when data marked with a bookmark is retrieved by the bookmark function, i.e., in a state in which a bookmark mode is selected, if the data is simply displayed, an operator cannot know a mode to which the data belongs. Therefore, the conventional structure is unsatisfactory in terms of the improvement of the facility of operations using the bookmark function.

Moreover, in the bookmark function, if the number of data marked with bookmarks increases, even when only data marked with bookmarks are searched, it is necessary to deal a large amount of data. Therefore, the primary merit of bookmark is lessened.

Furthermore, as to the methods of searching the bookmark data, there is a method in which bookmark data of a particular mode are sequentially searched, and then bookmark data of another mode are sequentially searched. When this method is employed, for example, bookmark data in data of a phone book ① mode are searched in order of Japanese kana syllabary, and then bookmark data in data of a phone book ② mode are searched in order of Japanese kana syllabary. Subsequently, bookmark data in data of a phone book ③ mode are searched in order of Japanese kana syllabary.

Such a searching method is inefficient because data having low priority order for sorting may be retrieved first and then data of higher priority order than the previously retrieved data may be retrieved from the next mode.

Besides, although above mentioned Japanese publication of unexamined patent application (Tokukaihei) No. 5-101038 discloses placing a bookmark, it does not mention outputting of a mode of the retrieved data and the number of bookmarks placed.

Moreover, the above-mentioned publication does not mention giving a warning at the time the number of bookmarks placed exceeds the upper limit, nor retrieving data marked with a bookmark according to a predetermined sorting rule.

Furthermore, although Japanese publication of unexamined patent application (Tokukaihei) No. 6-231186 discloses placing a bookmark, it does not teach a structure of marking each data with a bookmark for data search purposes.

SUMMARY OF THE INVENTION

It is a first object of the present invention to provide a function for retrieving data marked with a bookmark and simultaneously displaying the retrieved data and a mode to which the data belongs so as to achieve an improvement of the function of retrieving data marked with a bookmark.

A second object of the present invention is to realize a bookmark function of easy use by setting the upper limit in respect of the number of bookmarks to be placed, and giving a warning when an attempt to place bookmarks more than the upper limit is made so as to prevent the placement of bookmarks more than the upper limit.

A third object of the present invention is to realize a function of retrieving all data marked with bookmarks in a plurality of modes in order according to a predetermined sorting rule, by adopting the predetermined sorting rule for all of the plurality of modes. With this function, it is possible to prevent the user from having a sense of difference in order of retrieving data.

In order to achieve the above objects, a first information processing apparatus with a bookmark function of the present invention includes:

a memory;

a display section;

a control section for placing a bookmark in data, which are stored in the memory in a plurality of modes, respectively, storing specific information for specifying data marked with the bookmark in the memory, retrieving the stored data marked with the bookmark based on the specific information, and displaying the retrieved data in the display section, wherein when the stored data marked with the bookmark is retrieved based on the specific information, the control section displays in the display section a mode to which the retrieved data belongs together with the retrieved data.

With this structure, when the data marked with the bookmark is retrieved, the display section displays the retrieved data and the mode of the retrieved data. Therefore, the user can easily know the mode to which the data retrieved based on the bookmark belongs. It is thus possible to improve the utility of the bookmarks and the facility of the apparatus.

A second information processing apparatus with a bookmark function of the present invention includes:

a memory; and a control section for placing a bookmark in data, which are stored in the memory section in a plurality of modes, respectively, according to an input instructing placement of the bookmark, storing specific information for specifying data marked with the bookmark in the memory section, retrieving the stored data marked with the bookmark based on the specific information, and outputting the retrieved data, wherein the control section counts the number of bookmarks placed, sets the upper limit on the number of bookmarks to be placed, and gives a warning when an instruction to place bookmarks more than the upper limit is input.

With this structure, when an attempt to place a number of bookmarks more than the upper limit is made, a warning is given so as to prevent placement of bookmarks more than the upper limit. It is thus possible to prevent the number of bookmarks from being excessively large and the facility of bookmarks, i.e., the apparatus, from being degraded.

A third information processing apparatus with a bookmark function of the present invention includes:

a memory; and a control section for placing a bookmark in data, which are stored in the memory in a plurality of modes, respectively, storing specific information for specifying data marked with the bookmark in the memory, retrieving the stored data marked with the bookmark based on the specific information, and outputting the retrieved data, wherein the control section retrieves data marked with the bookmark in a predetermined sorting rule from all of data of the plurality of modes in the memory section, irrespective of mode.

With this structure, when retrieving data marked with a bookmark from data of the plurality of modes, all of the data with the bookmark of the plurality of modes are retrieved in order corresponding to the sorting rule. It is therefore possible to retrieve data of different modes by keeping the order of priority. This structure prevents the user from having a sense of difference in order of retrieving data.

For a fuller understanding of the nature and advantages of the invention, reference should be made to the ensuing detailed description taken in conjunction with the accompanying drawings.

BRIEF DESCRIPTION OF THE DRAWINGS

FIG. 3(a) is a view for explaining in detail the structure of a RAM shown in FIG. 1.

FIG. 3(b) is a view for explaining in detail the structure of a work RAM in a CPU shown in FIG. 1.

FIG. 3(c) is a view for explaining in detail the structure of a ROM shown in FIG. 1.

FIG. 3(d) is a view for explaining in detail the structure of data of phone book ① in a user area shown by b in FIG. 3(a).

FIG. 3(e) is a view for explaining in detail the structure of memo data in the user area shown by b in FIG. 3(a).

FIG. 3(f) is a view for explaining in detail the structure of schedule data in the user area shown by b in FIG. 3(a).

FIG. 4 is a view for explaining in detail a data attributes section (e-3) shown in FIGS. 3(a) to 3(f).

FIG. 5(a) is a view for showing an example of phone book data when setting a bookmark in an arbitrary location of data, and for explaining the front portion of the data.

FIG. 5(b) is a view for explaining the rear portion of the phone book data shown in FIG. 5(a).

FIG. 6 is a view for explaining an example of the structure of the bookmark code shown in FIGS. 5(a) and 5(b).

FIG. 7 is a view for explaining an example of the operation of the portable electronic device shown in FIG. 1, and showing key entries in a phone book mode and corresponding display examples in the display section.

FIG. 8 is a view for explaining an example of the operation of the portable electronic device following to the operation of FIG. 7, and mainly showing key entries for placing and deleting a bookmark and corresponding display examples in the display section.

FIG. 9 is a view for explaining an example of the operation of the portable electronic device following to the operation of FIG. 8, and mainly showing key entries when the number of bookmarks placed reaches the upper limit and corresponding display examples in the display section.

FIG. 10 is a view for explaining an example of the operation of the portable electronic device following to the operation of FIG. 9, and mainly showing key entries for placing another bookmark and corresponding display examples in the display section.

FIG. 11 is a view for explaining an example of the operation of the portable electronic device following to the operation of FIG. 10, and mainly showing key entries for retrieving data with bookmarks of a plurality of modes and corresponding display examples in the display section.

FIG. 12 is a view for explaining an example of the operation of the portable electronic device following to the operation of FIG. 11, and mainly showing key entries for deleting every data marked with a bookmark at a time and corresponding display examples in the display section.

FIG. 13 is a view for explaining an example of the operation of the portable electronic device following to the operation of FIG. 12, and mainly showing key entries for placing a bookmark in an arbitrary location of user data and corresponding display examples in the display section.

FIG. 24 shows an example of the operation of the portable electronic device of FIG. 1 by a flow chart of a process for deleting every data marked with a specific bookmark at a time.

DESCRIPTION OF THE PREFERRED EMBODIMENT

The following description will explain an embodiment of the present invention with reference to FIGS. 1 to 24.

Figure 1:
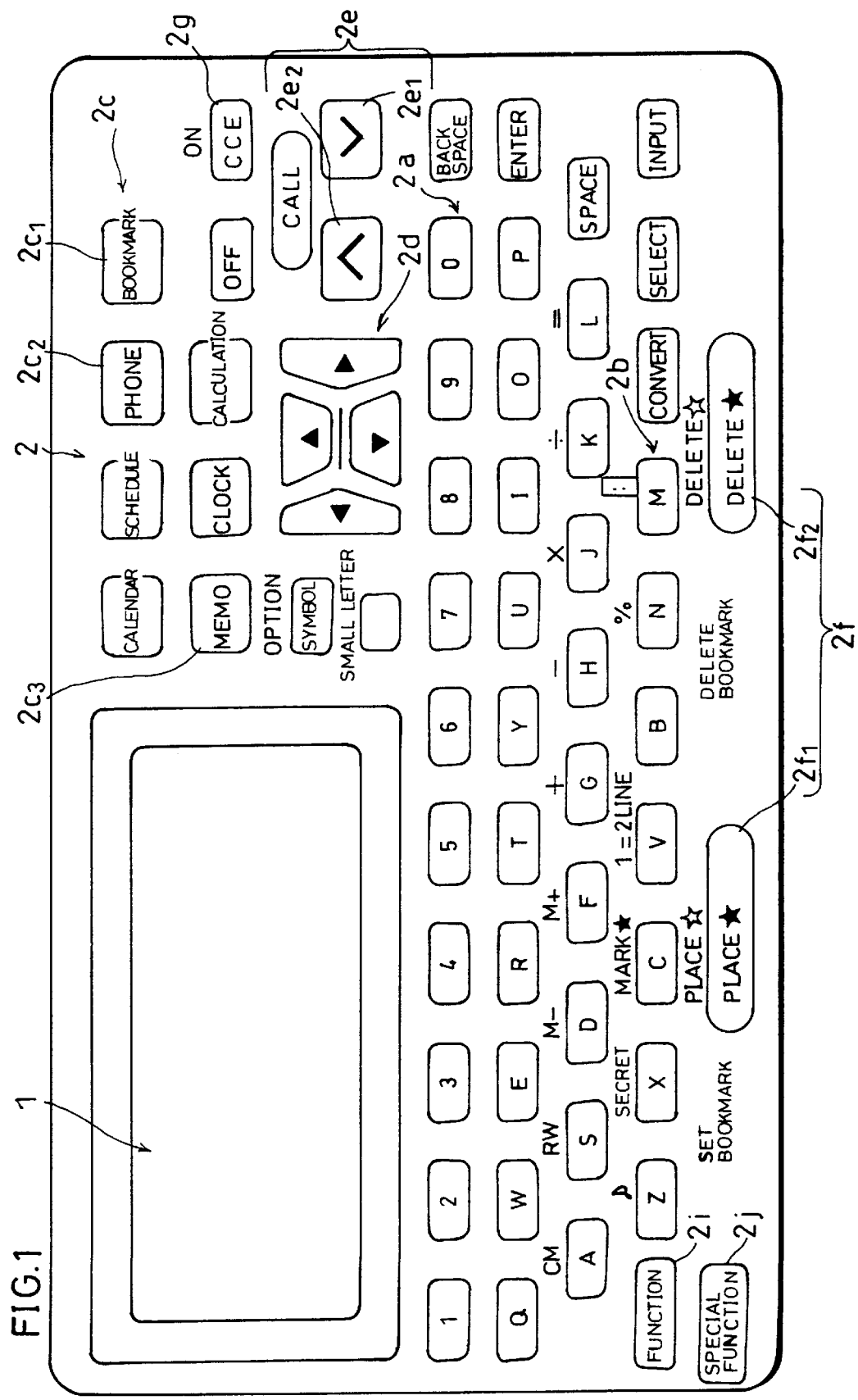
FIG. 1 is a view showing the appearance of a portable electronic device according to one embodiment of the present invention.

FIG. 1 shows the appearance of a portable electronic device as an information processing apparatus with a bookmark function of the present invention.

As illustrated in FIG. 1, the portable electronic device includes a display section 1 (display means) formed of a liquid crystal material.

In FIG. 1, a reference numeral "2" represents a key entry section. The key entry section 2 includes the 0 to 9 keys as numeric keys 2a, the A to Z keys as alphabet input keys 2b, and mode selecting keys 2c including the SCHEDULE mode key, CALENDAR mode key, etc. for selecting respective application modes. In particular, the BOOKMARK mode key $2c_1$ is a key for switching the application mode to a bookmark retrieving mode in which only data marked with a bookmark by a user are retrieved. Namely, by making a one-touch to the BOOKMARK mode key $2c_1$, the application mode is switched to the bookmark retrieving mode.

The key entry section 2 also includes cursor moving keys 2d, data retrieve keys 2e, and bookmark setting keys 2f. The bookmark setting keys 2f include a SET BOOKMARK key $2f_1$, "PLACE ★", for allowing the user to mark desired data with a bookmark, and a DELETE BOOKMARK key $2f_2$, "DELETE ★", for allowing the user to delete the bookmark from the data marked with the bookmark.

Figure 2:
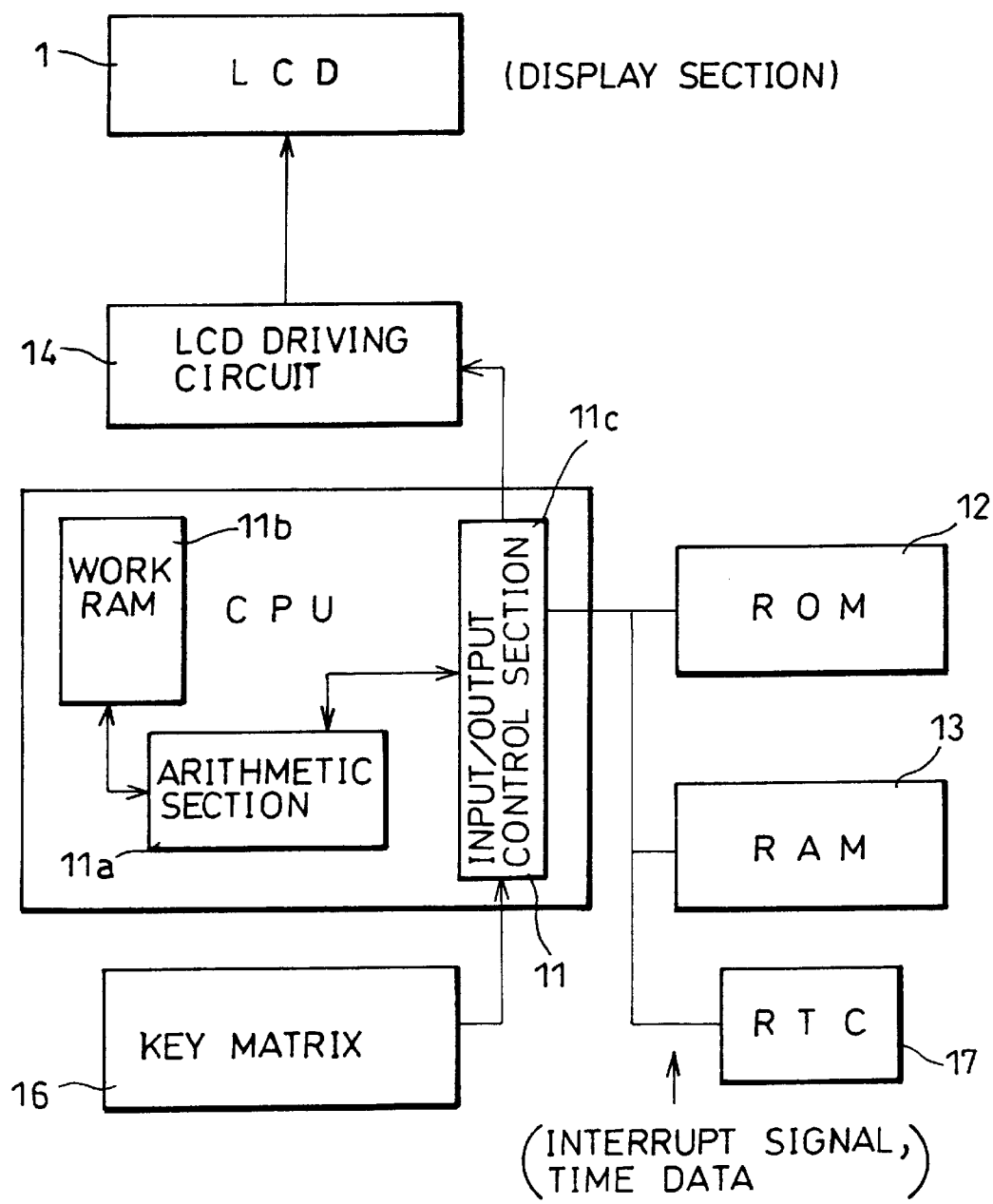
FIG. 2 is a system block diagram of the portable electronic device.

FIG. 2 is a system block diagram of the portable electronic device of this embodiment.

As illustrated in FIG. 2, the portable electronic device includes a CPU 11 (control means) for controlling the portable electronic device. The CPU 11 is formed by an arithmetic section 11a, a work RAM 11 (memory means), an input/output control section 11c, etc.

The portable electronic device also includes a ROM 12 for storing programs and various font data for operating the portable electronic device, and a RAM (random access memory) 13 used for controlling the portable electronic device and storing data. The RAM 13 is used as a memory area to store flags for use in control of the portable electronic device and data such as a phone book input by the user, and as registers.

The portable electronic device is provided with an LCD driving circuit 14 for controlling driving of the LCD display as a display section 1, a key matrix 16 for detecting an input entered through the key entry section 2, and a real time clock (RTC) 17. The RTC 17 is formed by an IC for counting time, and informs the CPU 11 of time data, etc. through an interrupt operation.

FIGS. 3(a) to 3(f) show an example of the structure of a memory section of this portable electronic device.

Referring to FIGS. 3(a) to 3(f), the following description will explain in detail the memory section (RAM 13, ROM 12, and work RAM 11b in the CPU 11) shown in the system block diagram (FIG. 2).

First, the RAM 13 will be explained with reference to FIG. 3(a).

In FIG. 3(a), "a" represents a system management area used for various control operations.

"b" is a data storage area (user area) which is divided into sections corresponding to respective modes, such as phone book ①, phone book ②, phone book ③, memo, and schedule. For example, in the case of the data of the phone book ①, as illustrated in FIG. 3(d), the data is formed as a collection of data including the information of the data length (e-2), attributes (e-3), name (e-4), telephone number (e-5), and address (e-6) separated by a header (e-1) and delimiter codes (e-7). Similarly, the data of the telephone directories ② and ③ also have such a structure. In the case of the phone book mode, data are usually sorted in order of the Japanese kana syllabary or in alphabetical order, based on the names of the data.

Similarly, in the case of the memo mode, as shown in FIG. 3(e), the data is formed by a collection of data including the information of the data length (e-2), attributes (e-3), contents (e-8), separated by the header (e-1).

In the case of the schedule mode, as shown in FIG. 3(f), the data is formed by a collection of data including the information of the data length (e-2), attributes (e-3), year-month-day (e-9) and contents (e-8), separated by the header (e-1) and delimiter code (e-7).

The above-mentioned data structures merely demonstrate an embodiment of the invention, and the present invention can be implemented if the respective data contain data attributes.

Referring now to FIG. 3(b), the following description will explain the work RAM 11b in the CPU 11.

In FIG. 3(b), "h" represents a pointer (specific information) for indicating data being displayed. The value of a pointer to the data displayed as a result of data search is stored in a PTR.

"i" is a memory for storing the number of bookmarks placed. In this embodiment, the memory can store the number of two types of bookmarks "★" and "☆", respectively. "j" is a buffer for storing pointers to data marked with bookmarks in the respective modes.

"k" represents an area used during search or deletion of a bookmark, for storing information indicating which type of bookmark is being searched for or deleted. "l" is a pointer for searching for a bookmark code.

Finally, with reference to FIG. 3(c), the following description will explain the ROM 12.

In FIG. 3(c), "m" represents a memory area which stores programs for operating the portable electronic device. "n" is a memory area which stores fonts for displaying various characters. "○" is a table of various data used to assist the operations of the programs.

FIG. 4 shows the items of the data attributes section (e-3) shown in FIGS. 3(d) to 3(f). In FIG. 4, the "BIT" indicates whether the data is bookmark data or not. When a bit representing a bookmark is set, the item "NO." stores a setting number, i.e., first, second, etc., which was assigned to each bookmark ("★" or "☆" in this embodiment) when the data including the data attributes was marked with the bookmark. The setting number indicates the order in which a particular bookmark was placed within the series of bookmarks of the same type.

FIGS. 5(a) and 5(b) show an example of user data when bookmarks "★" and "☆" are coded and stored in the data. More specifically, FIG. 5(a) indicates the front portion of the user data, and FIG. 5(b) shows the rear portion thereof.

FIG. 6 shows in detail the codes "bkmcd1" and "bkmcd2" of a bookmark placed in an arbitrary location.

Each of the bookmark codes is formed by two codes "kd1" and "kd2". "kd1" represents a bookmark and the type of the bookmark. "kd2" shows the order in which the bookmark was placed within the series of the same type of bookmarks.

FIGS. 7 to 14 show an example of the operation of this device. Each figure shows a key entry (a key pressed), and an example of display exhibited in the display section 1 in each step.

In step (indicated by S in the drawing) 1, first, the ON key $2g$ is pressed to turn on the power. Then, when the PHONE key $2c_2$ of the mode selecting keys $2c$ is pressed to switch to the phone book ① mode, the display section 1 displays the state shown in FIG. 7.

In this device, there are three phone book modes, i.e., phone book ① mode to phone book ③ mode. Whenever the PHONE mode key $2c_2$ of the mode selecting keys $2c$ is pressed, the modes are switched in the order "phone book ①→phone book ②→phone book ③→phone book ①. . .".

In the phone book mode, the data are rearranged in order of the character code of name (in order of Japanese kana syllabary, A to Z, or 0 to 9), and stored. In step 2, the forward search key $2e_1$ of the data retrieve keys $2e$ is pressed to retrieve the leading data of a phone book.

As shown in steps 3, 4 and 5, whenever the forward search key $2e_1$ is pressed in the above mentioned state, the next phone book data is sequentially retrieved. After a search for the last data (step 5), when the forward search key $2e_1$ is pressed, the initial display of the phone book mode shown in step 6 (FIG. 8) appears again.

Next, in step 7, the forward search key $2e_1$ is pressed twice to search for data "BBB". Subsequently, as shown in step 8, the SET BOOKMARK key $2f_1$ ("PLACE ★" key) is pressed to mark the currently displayed data "BBB" with a bookmark. Then, the symbol "★" indicating that the data is marked with a bookmark appears in the position of data "BBB". "1" on the right side of the symbol "★" indicates that this bookmark was set first within the series of bookmarks Thereafter, when the DELETE BOOKMARK key $2f_2$ ("DELETE ★" key) is pressed in step 9, the bookmark placed in data "BBB" is deleted, and the symbol "★" indicating that the data is marked with a bookmark disappears.

Next, in step 10, the SET BOOKMARK key $2f_1$ is pressed to place the bookmark in data "BBB" again. In the following step 11 (FIG. 9), the next data "CCC" is specified as data marked with the bookmark. In this case, "2" is displayed on the right side of the symbol "★" to indicate that the data "CCC" is the second data marked with the bookmark "★".

The following description will explain the operation when the number of bookmarks is limited to an upper limit of 10.

However, needless to say, the upper limit of the bookmark data is not necessarily restricted to 10, and the user can freely set the upper limit of the number of bookmarks to be placed.

Step 12 shows a state in which the number of data marked with the bookmark is increased and the tenth bookmark has been set.

In the following step 13, the next data is searched out. When an attempt to set the bookmark is made in step 14, the display section 1 exhibits a warning display as shown in FIG. 9. Then, in step 15, the display section 1 returns to the previous display (the same display as in step 13). In this state, when the FUNCTION key $2i$ and the SET BOOKMARK key $2f_1$ are pressed as shown in step 16 (FIG. 10), another type of bookmark indicated by symbol "☆" can be set.

In this embodiment, an example in which another bookmark is set by pressing the FUNCTION key $2i$ and the SET BOOKMARK key $2f_1$ is illustrated. However, needless to say, there are a number of methods for setting different types of marks. An example of such methods includes displaying the menu screen by a specific key operation and specifying a mark from several types of prepared marks shown in the menu.

In this case, in step 17, the bookmark "★" is deleted from the previous data. In step 18, data marked with a bookmark indicated by the next symbol "☆" is displayed.

Next, the following description will explain step 19 in which the bookmark "★" is additionally placed in the data marked with the bookmark "☆".

This state indicates that the data "Peter" is the first bookmark data marked with the symbol "☆" and also the tenth bookmark data marked with the symbol "★". Hence, this device can place several types of bookmarks in a single data.

As described above, by showing the setting number of each bookmark in the display section 1 (for example, steps 8, 12 and 19), the user is not required to manage the number of bookmarks placed. As a result, the portable electronic device of the present invention can be used more easily. More specifically, when several types of bookmarks have been set, it is a troublesome task for the user to remember how many bookmarks of each type have been placed. Moreover, even when only one type of bookmark is used, it is troublesome task for a user to manage by himself how many bookmarks have been registered and how many bookmarks are still available for registration. With the above-mentioned structure, such troublesome tasks are no longer required.

In step 20, the BOOKMARK mode key $2c_1$ is pressed to switch to a bookmark mode as a mode for retrieving data marked with a bookmark.

Here, first, whether data marked with the bookmark "★" or data marked with the bookmark "☆" is to be searched for is selected. In an example of step 21 (FIG. 11), data marked with the symbol "★" is selected by pressing a numeric key $2a$.

In step 21, if there is no data marked with the bookmark "★", the display shown in step 25 is exhibited for about 1 second, and then the previous display (the display shown in step 20) is exhibited again.

Of course, if the portable electronic device uses only one type of bookmark, the operation shown in step 21 or 25 is performed at the time the BOOKMARK mode key $2c_1$ is pressed.

In step 21, it is shown at the bottom of the display that search for data marked with the bookmark is in progress and the mode of the currently displayed data.

Furthermore, when the forward search key $2e_1$ is pressed in step 21, data of the phone book ① mode are retrieved in alphabetical order in step 22. Similarly, when the forward search key $2e_1$ is pressed, data of the phone book ② mode and data of the phone book ③ mode are retrieved in alphabetical order in step 23 and step 24, respectively. Here, when the backward search key $2e_2$ of the data retrieve keys 2e is pressed, data are retrieved in reverse alphabetical order.

In this embodiment, the data are arranged in alphabetical order. However, needless to say, the rule of arranging data is not particularly restricted, and therefore the data can be arranged in order of their input time, telephone numbers, etc.

As described above, in the example shown in step 21 to step 24, data of different modes are retrieved according to the same arrangement rule (alphabetical order in this embodiment).

Next, an example of implementing a function of deleting only data marked with a specific bookmark is shown in step 26 to step 30 of FIG. 12.

First, in step 26, when the SPECIAL FUNCTION key 2*j* of the key entry section 2 is pressed, a Special Function Menu is displayed. Next, the data delete function is selected in step 27, and the function of deleting data with a specific bookmark is selected in step 28.

Then, in step 29, selection and deletion of a bookmark placed in desired data to be deleted are executed. After the deletion, the confirmation display appears in the display section 1 in step 30.

With reference to step 31 (FIG. 13) and succeeding steps, an example of a bookmark which can be placed in an arbitrary location of data will be described.

First, step 31 shows a state in which a predetermined data is retrieved in the memo mode. The downward arrow (↓) shown in the left side of the display indicates that there is a non-displayed or hidden portion below the display. The memo mode is set by pressing the MEMO mode key $2c_3$ of the mode selecting keys 2*c*.

In step 32, by pressing the cursor moving key 2*d*, the down scroll of the screen is performed. In step 33, by pressing the SET BOOKMARK key $2f_1$, a bookmark represented by the symbol "★" is placed in a desired location of data (in this example, the location where a map is displayed). In step 34, by pressing the cursor moving key 2*d*, the cursor is moved to a different arbitrary location of the same data. Thereafter, in step 35, another type of bookmark represented by the symbol "☆" is placed in the location (in this example, the location where the "Things to be brought" are listed) by pressing the FUNCTION key 2*i* and the SET BOOKMARK key $2f_1$.

Subsequently, in step 36, the bookmark mode is activated by pressing the BOOKMARK mode key $2c_1$. In step 37 (FIG. 14), search for bookmark "★" is performed, and the data in the location where the bookmark was set in previous step 33 is retrieved.

In step 38, the bookmark "★" which was set previous to the setting of the bookmark "★" in step 33 is retrieved. Similarly, in steps 39 and 40, the data in the location where the bookmark ☆ was set in step 35 is retrieved.

FIGS. 15 to 24 are flow charts for showing how to operate this portable electronic apparatus.

Figure 15:
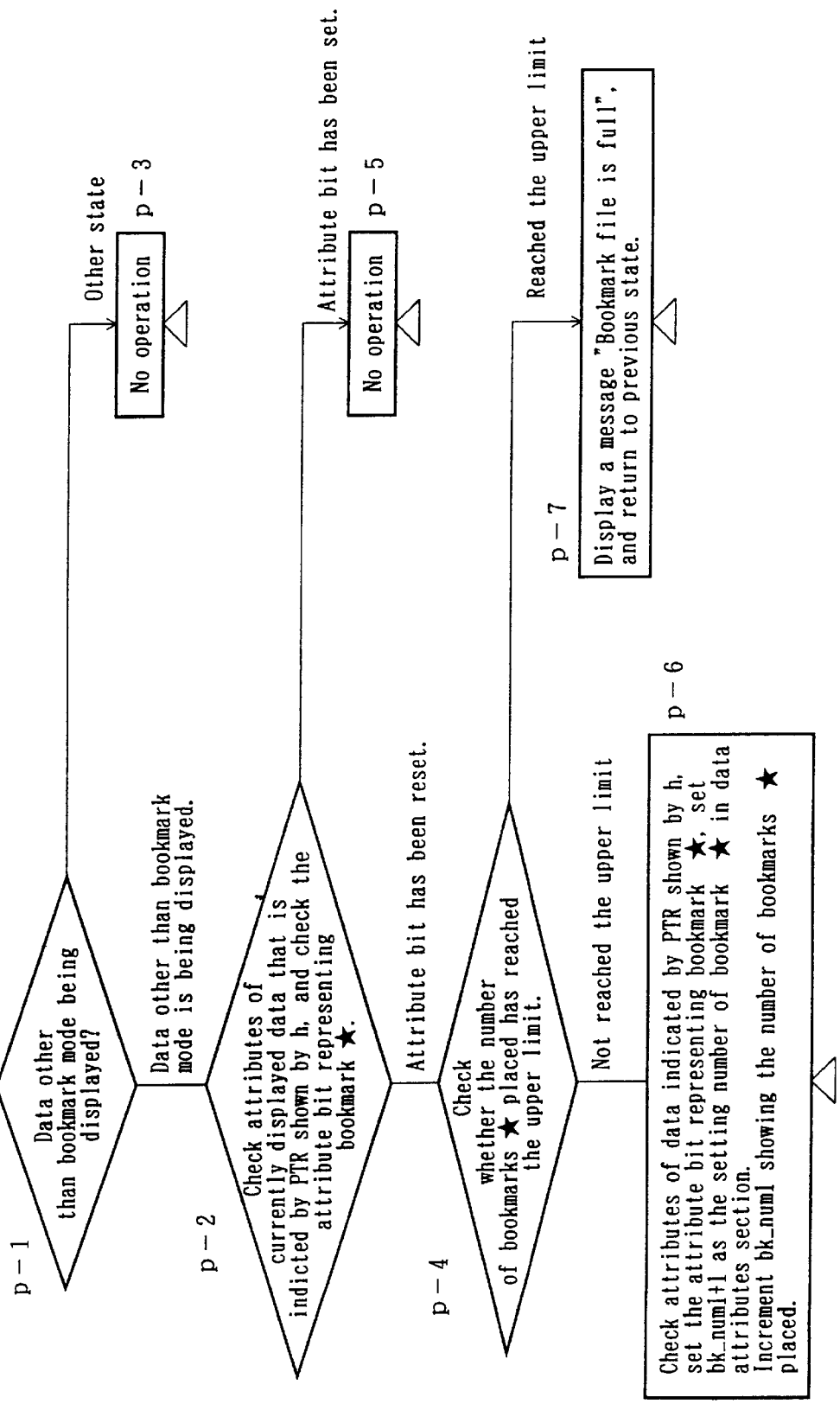
FIG. 15 shows an example of the operation of the portable electronic device of FIG. 1 by a flow chart of a process corresponding to a key entry for marking user data with a bookmark represented by a symbol "★".
Figure 16:
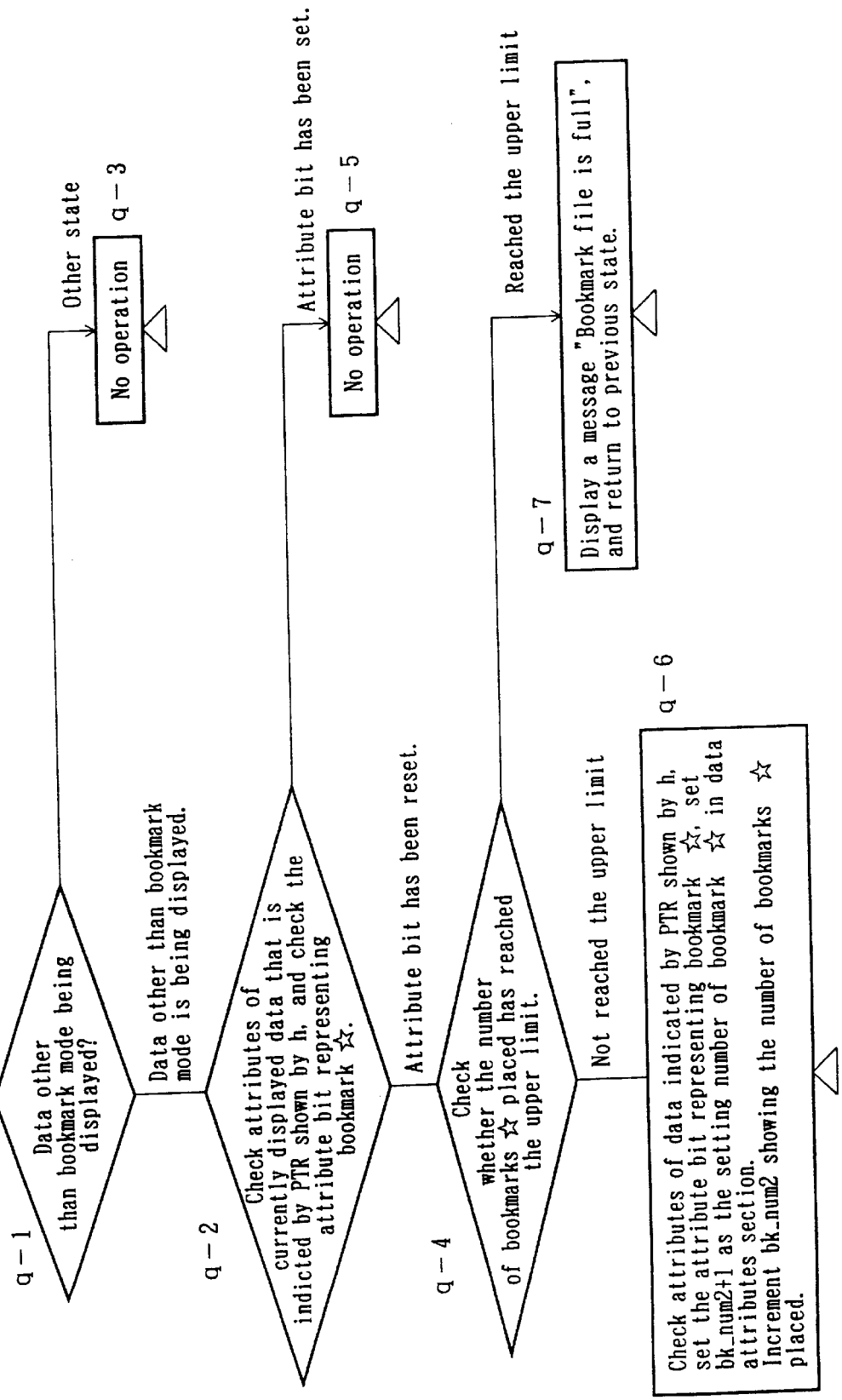
FIG. 16 shows an example of the operation of the portable electronic device of FIG. 1 by a flow chart of a process corresponding to a key entry for marking user data with a bookmark represented by a symbol "☆".
Figure 17:
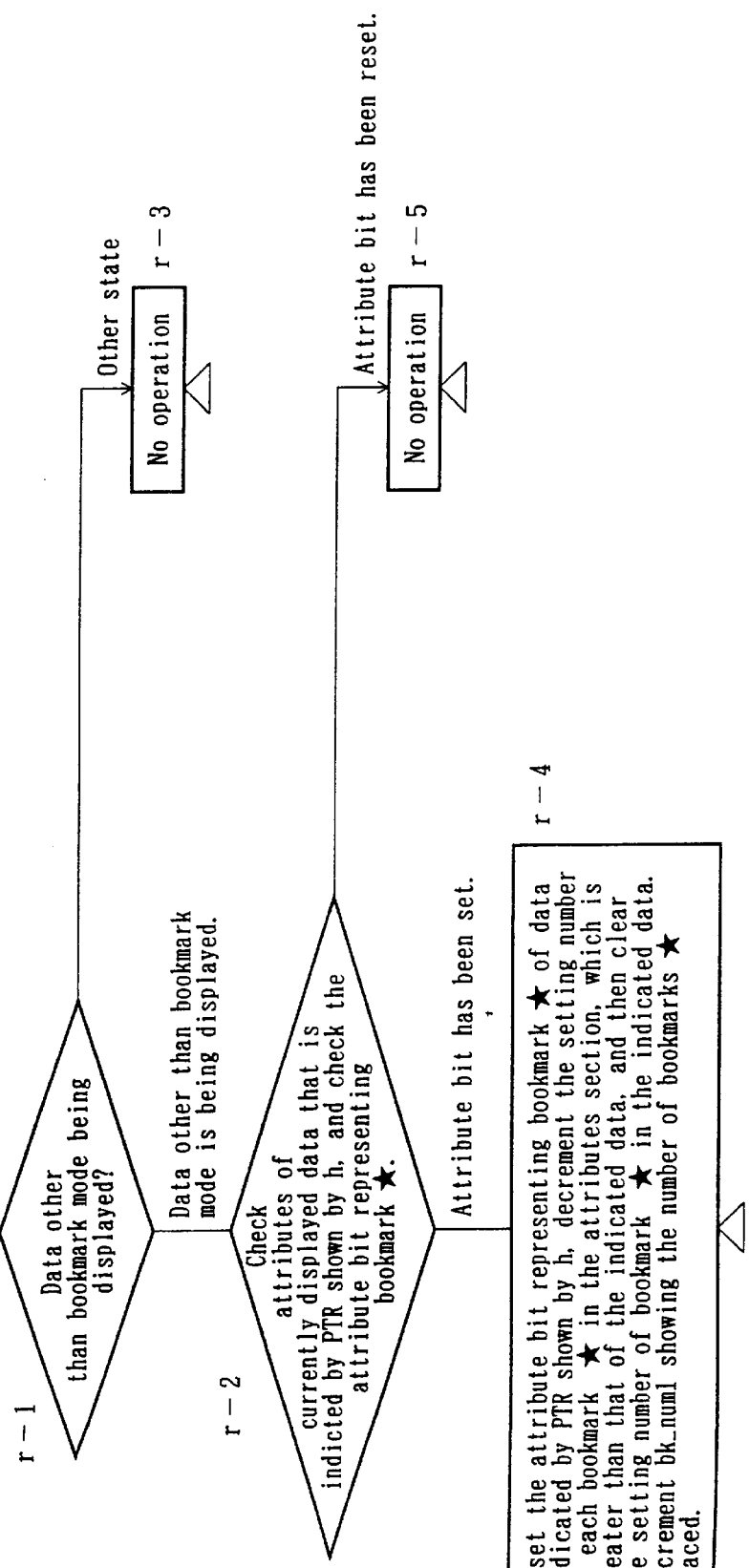
FIG. 17 shows an example of the operation of the portable electronic device of FIG. 1 by a flow chart of a process corresponding to a key entry for deleting the bookmark "★" from the user data.
Figure 18:
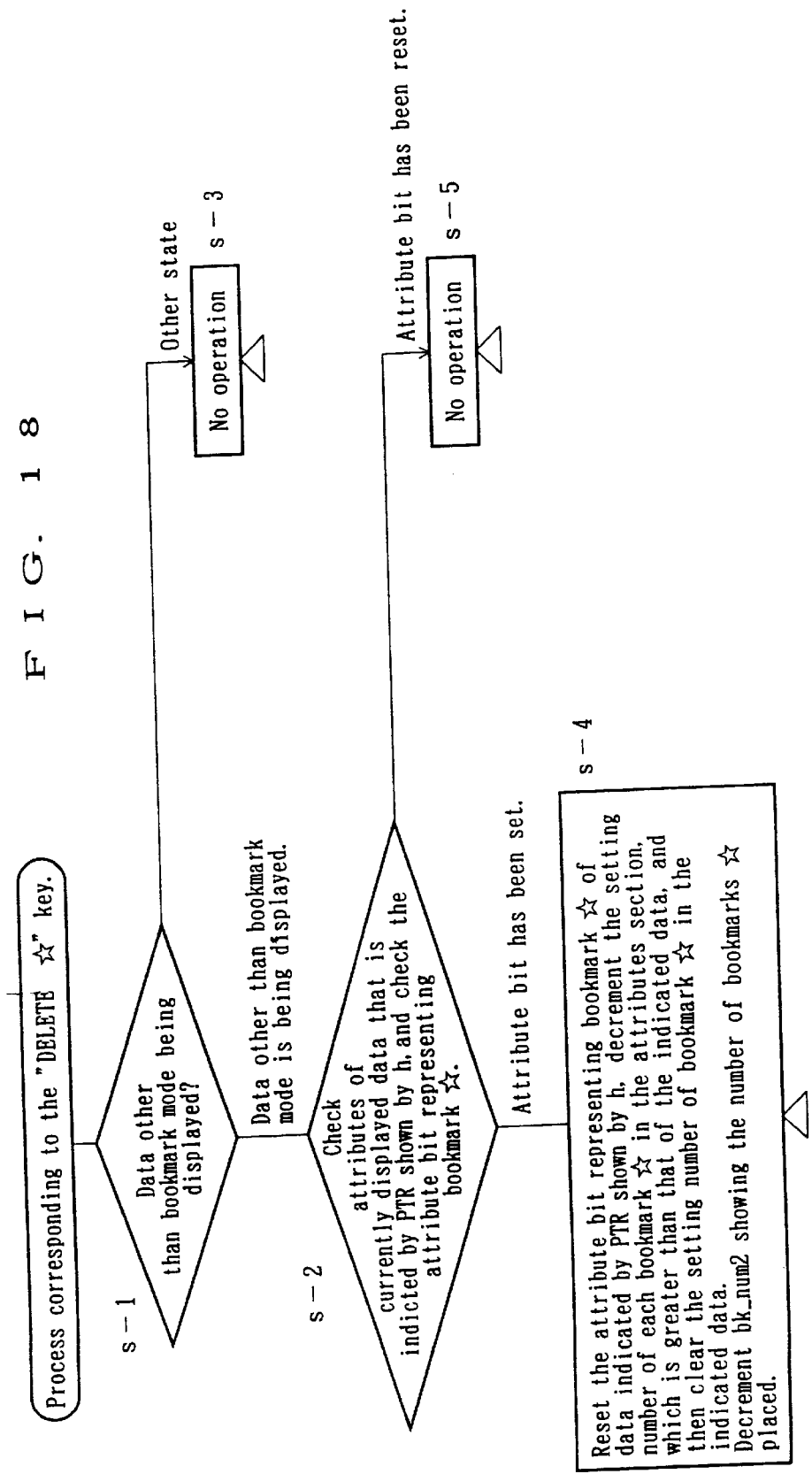
FIG. 18 shows an example of the operation of the portable electronic device of FIG. 1 by a flow chart of a process corresponding to a key entry for deleting the bookmark "☆" from the user data.

FIG. 15 shows a process corresponding to the operation of the SET BOOKMARK (PLACE ★) key $2f_1$ for placing a bookmark in the currently displayed data. Similarly, FIG. 16 shows a process corresponding to the operation of the SET BOOKMARK (PLACE ☆) key $2f_1$ for placing a type of a bookmark different from the one shown in FIG. 15 in the currently displayed data. FIG. 17 shows a process corresponding to the operation of the DELETE BOOKMARK (DELETE ★) key $2f_2$ for removing the bookmark from data marked with bookmark "★". Similarly, FIG. 18 shows a process corresponding to the operation of the DELETE BOOKMARK (DELETE ☆) key $2f_2$ for removing the bookmark from data marked with bookmark "☆". The types of bookmarks are not necessarily limited to the above-mentioned two types. Namely, various types of bookmarks can be used if memories and data attributes corresponding to the desired number of bookmark types are provided.

Figure 19:
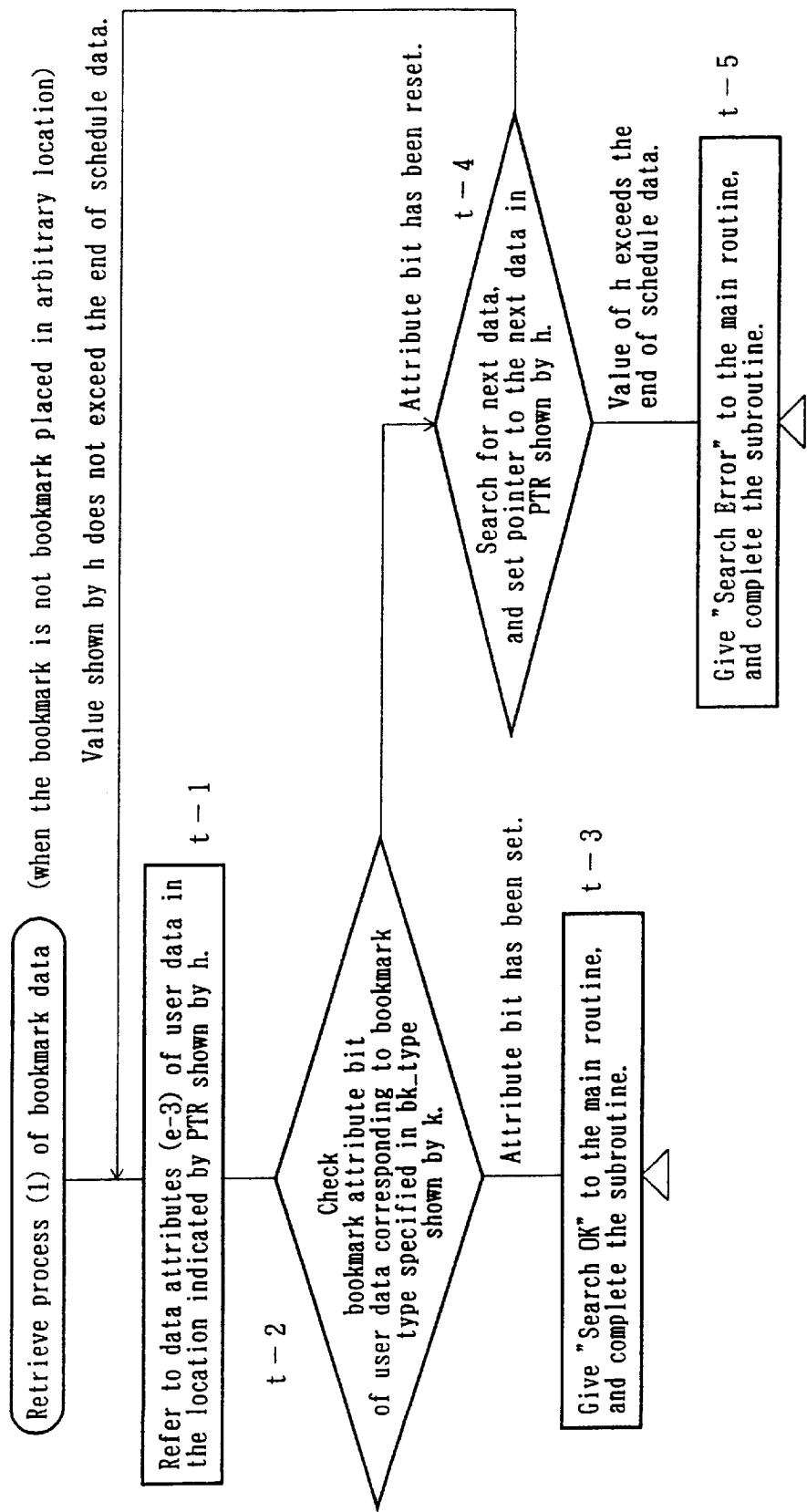
FIG. 19 shows an example of the operation of the portable electronic device of FIG. 1 by a flow chart of a process for retrieving data marked with a bookmark when the bookmark is placed in data as a unit.

FIG. 19 shows a subroutine for retrieving bookmark data when a bookmark is set in data as a unit.

Figure 21:
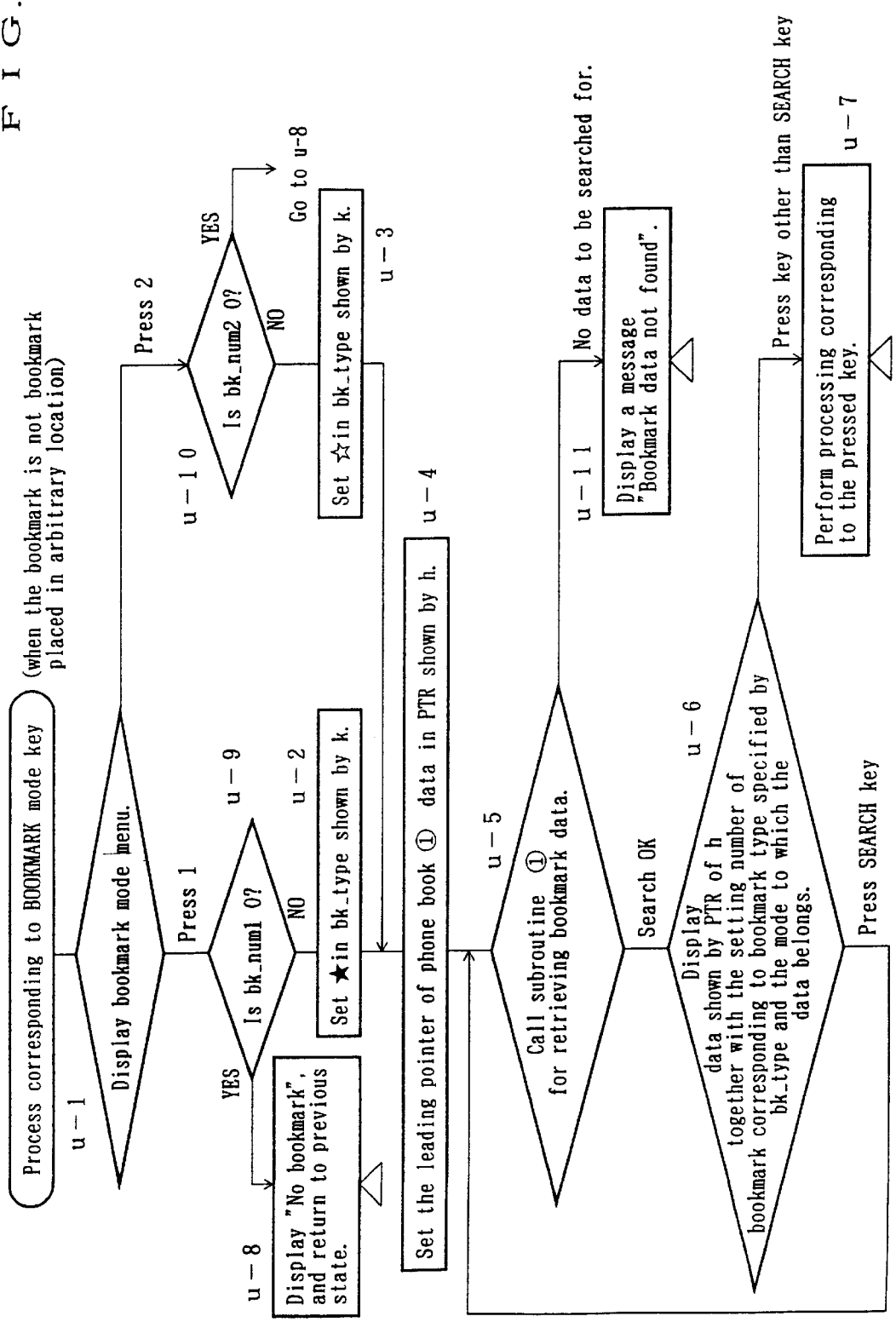
FIG. 21 shows an example of the operation of the portable electronic device of FIG. 1 by a flow chart of a process performed when the BOOKMARK mode key shown in FIG. 1 is pressed at the time a bookmark is placed in data as a unit.
Figure 22:
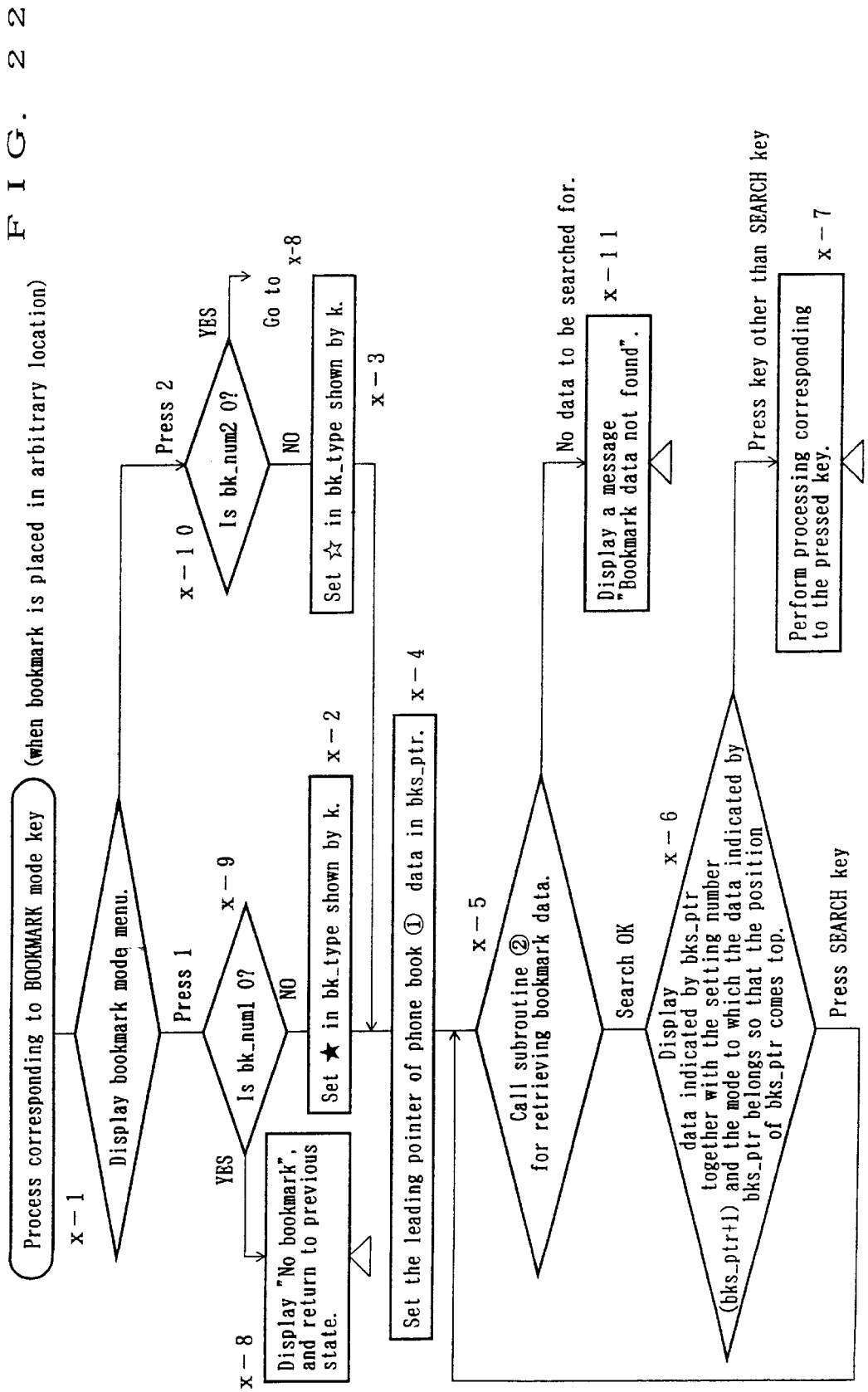
FIG. 22 shows an example of the operation of the portable electronic device of FIG. 1 by a flow chart of a process performed when the BOOKMARK mode key shown in FIG. 1 is pressed at the time a bookmark is placed in an arbitrary location of data.

FIG. 21 shows a process corresponding to the operation of the BOOKMARK mode key $2c_1$ when a bookmark is set in data as a unit. FIG. 22 shows a process corresponding to the operation of the BOOKMARK mode key $2c_1$ when a bookmark is set in an arbitrary location of data.

Figure 23:
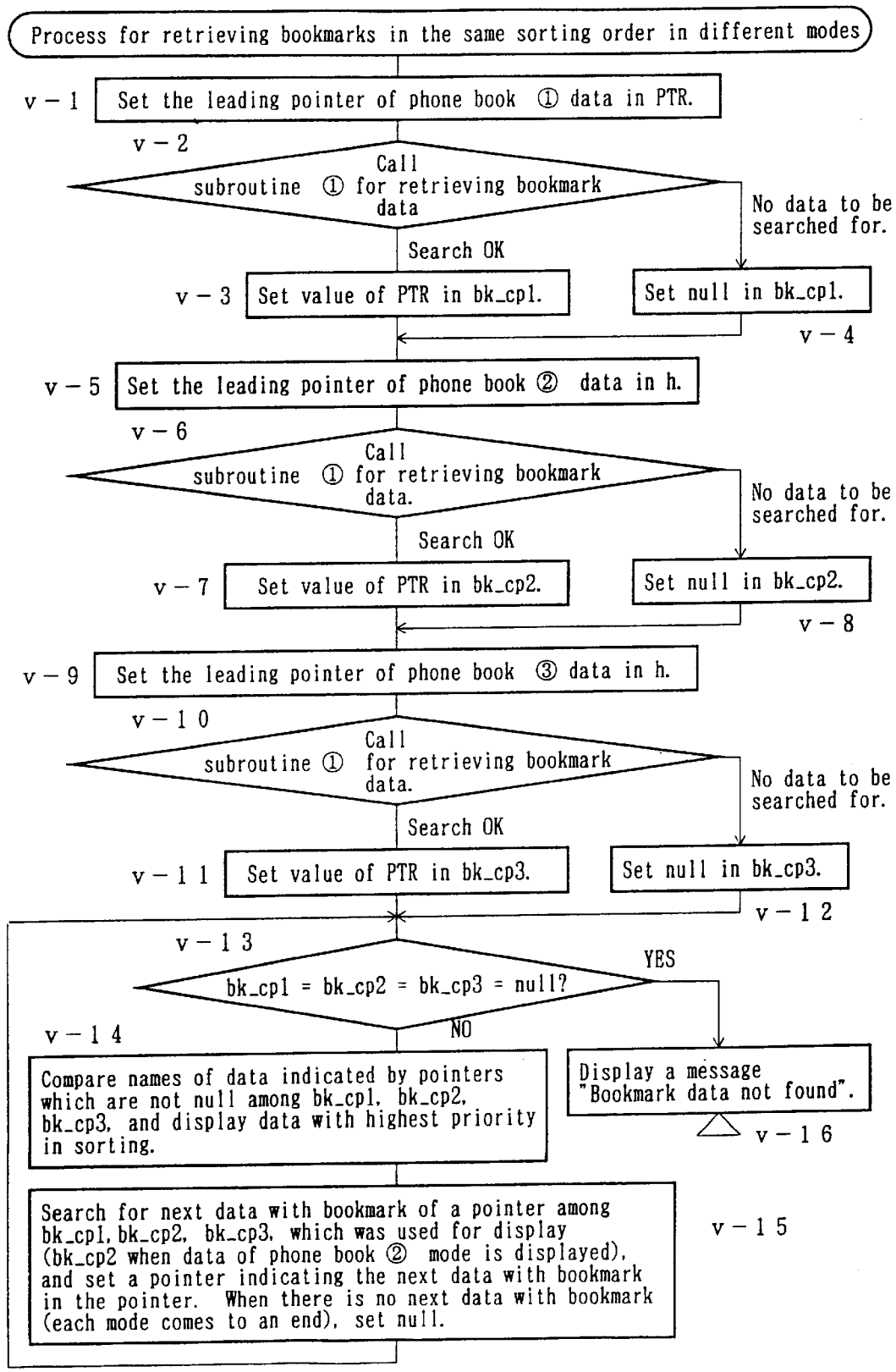
FIG. 23 shows an example of the operation of the portable electronic device of FIG. 1 by a flow chart of a process for retrieving data marked with a bookmark in a unified sorting order from data of a plurality of modes.

FIG. 23 shows an example of a retrieving process for retrieving bookmark data of different modes in a unified sorting order.

FIG. 24 shows a process for deleting only and all bookmark data at a time.

In the process shown in FIG. 15, first, in step p-1 it is checked whether the current mode is a mode other than the bookmark mode and whether data is being searched for or displayed.

As a result, if the current mode is a mode other than the bookmark mode and no data is being searched for or displayed in step p-1, the program proceeds to step p-3 and no operation is performed.

On the other hand, in step p-1, if the current mode is a mode other than the bookmark mode and data is being searched for or displayed, the program moves to step p-2, and the pointer to the displayed data is stored. At this time, the attributes of the data indicated by the pointer stored in the PTR shown by h in FIG. 3(*b*) are checked for the attribute bit representing the bookmark "★".

According to the result of checking performed in step p-2, if the attribute bit has been set, the data is data marked with the bookmark. Therefore, the program moves to step p-5, and no operation is carried out.

On the other hand, if it is found from the result of checking performed in step p-2 that the attribute bit has been reset, a bookmark is not placed in the data. In this case, the program proceeds to step p-4 so as to place the bookmark in the data.

In step p-4, with reference to a register bk_num1, shown by i of FIG. 3(*b*), for storing the number of bookmarks "★" placed, it is checked whether the number of bookmarks "★" has reached the upper limit.

If it has reached the upper limit, the number of bookmarks "★" can not be increased any longer. Therefore, the program proceeds to step p-7, and a message, for example, "BOOKMARK FILE IS FULL" is displayed as shown in step 14 of FIG. 9. Then, the program returns to a key entry waiting state.

On the other hand, if the number of bookmarks "★" has not reached the upper limit in step p-4, the program moves to step p-6, and the next processing is carried out. First, in the attributes of the data indicated by the pointer stored in the PTR shown by h in FIG. 3(*b*), the attribute bit representing bookmark "★" ("*" bit shown in FIG. 4) is set. Then, in the data attributes section indicating the setting number of the bookmark "★" ("SETTING NO" in FIG. 4), a value obtained by adding one to the value of bk_num1 shown by i in FIG. 3(b), i.e., bk_num1+1, is set. Thereafter, one is added to the value of bk_num1.

Alternatively, after adding one to the value of bk_num1, the resultant value can be set as the setting number of bookmark "★" in the data attributes section, if desired.

In FIG. 16, steps q-1 to q-7 show a process for placing a bookmark "☆". There is a only difference between this process and the process for placing a bookmark "★". Namely, different attribute sections and registers for storing the number of bookmarks placed are used for the respective marks. However, this process will be explained below for the sake of clarification.

In step q-1, it is checked whether the current mode is a mode other than the bookmark mode and whether data is being searched for or displayed.

As a result of checking in q-1, if it is found that the current mode is a mode other than the bookmark mode and no data is being searched for or displayed, the program moves to step q-3, and no operation is carried out.

On the other hand, in step q-1, if it is found that the current mode is a mode other than the bookmark mode and data is being searched for or displayed, the program moves to step q-2, and the pointer to the displayed data is stored. Then, the attributes of the data indicated by the pointer stored in the PTR shown by h in FIG. 3(b) is checked for the attribute bit representing the bookmark "☆".

According to the result of checking performed in step q-2, if the attribute bit has been set, the data is data marked with the bookmark. Therefore, the program moves to step q-5, and no operation is carried out.

On the other hand, if it is found from the result of checking performed in step q-2 that the attribute bit has been reset, the bookmark is not placed in the data. In this case, the program proceeds to step q-4, and the process for setting the bookmark is performed.

In step q-4, with reference to the register bk_num2 for storing the number of bookmarks "☆" placed, shown by i of FIG. 3(b), it is checked whether the number of bookmarks "☆" has reached the upper limit. If the number of bookmarks "☆" has reached the upper limit, the number of bookmarks "☆" can not be increased any longer. Therefore, the program proceeds to step q-7, and a message, for example, "BOOKMARK FILE IS FULL" is displayed as shown in step 14 of FIG. 9. Then, the program returns to the key entry waiting state.

On the other hand, if the number of bookmarks "☆" has not reached the upper limit in step q-4, the program moves to step q-6, and the next processing is carried out. First, in the attributes of the data indicated by the pointer stored in the PTR shown by h in FIG. 3(b), the attribute bit representing the bookmark "☆" ("*" bit shown in FIG. 4) is set. Then, in the data attributes section indicating the setting number of the bookmark "☆" ("SETTING NO" in FIG. 4), a value obtained by adding one to the value of bk_num2 shown by i in FIG. 3(b), i.e., bk_num2+1, is set. Thereafter, one is added to the value of bk_num2.

Alternatively, after adding one to the value of bk_num2, the resultant value can be set as the setting number of the bookmark "☆" in the data attributes section, if desired.

In FIG. 17, steps r-1 to r-5 show a process for deleting a bookmark "★".

First, in step r-1, it is checked whether the current mode is a mode other than the bookmark mode and whether data is being searched for or displayed.

In r-1, if it is found that the current mode is a mode other than the bookmark mode and no data is being searched for or displayed, the program moves to step r-3, and no operation is carried out.

On the other hand, in step r-1, if it is found that the current mode is a mode other than the bookmark mode and data is being searched for or displayed, the program moves to step r-2, and the pointer to the displayed data is stored. Then, the attributes of the data indicated by the pointer stored in the PTR shown by h in FIG. 3(b) is checked for the attribute bit representing the bookmark "★".

According to the result of checking performed in step r-2, if the attribute bit has been reset, no bookmark is placed in the data. Therefore, the program moves to step r-5, and no operation is carried out.

On the other hand, if it is found from the result of checking performed in step r-2 that the attribute bit has been set, the data is data marked with the bookmark. In this case, the program proceeds to step r-4, and deletion of the bookmark is performed.

In step r-4, in the attributes of the data indicated by the pointer stored in the PTR shown by h in FIG. 3(b), the attribute bit representing the bookmark "★" ("*" bit shown in FIG. 4) is reset. Next, decrement of the setting number is performed. Specifically, one is subtracted from the setting number of each bookmark "★" which is greater than the setting number of the bookmark "★" placed in the indicated data. Then, the setting number of the bookmark "★" ("SETTING NO.1 in FIG. 4) is cleared (set to zero) in the data attributes section of the indicated data. Moreover, one is subtracted from the value of the register bk_num1 for storing the number of bookmarks "★" placed.

In FIG. 18, steps s-1 to s-5 show a process for deleting a bookmark "☆". There is a only difference between this process and the process for deleting a bookmark "★". Namely, different attribute sections and registers for storing the number of bookmarks are used for the respective marks. However, this process will be explained below for the sake of clarification.

First, in step s-1, it is checked whether the current mode is a mode other than the bookmark mode and whether data is being searched for or displayed.

In s-1, if it is found that the current mode is a mode other than the bookmark mode and no data is being searched for or displayed, the program moves to step s-3, and no operation is carried out.

On the other hand, in step s-1, if it is found that the current mode is a mode other than the bookmark mode and data is being searched for or displayed, the program moves to step s-2, and the pointer to the displayed data is stored. Then, the attributes of the data indicated by the pointer stored in the PTR shown by h in FIG. 3(b) is checked for the attribute bit representing the bookmark "☆".

According to the result of checking performed in step s-2, if the attribute bit has been reset, no bookmark is placed in the data. Therefore, the program moves to step s-5, and no operation is carried out.

On the other hand, if it is found from the result of checking performed in step s-2 that the attribute bit has been set, the data is data marked with the bookmark. In this case, the program proceeds to step s-4, and the process of deleting the bookmark is performed.

In step s-4, in the attributes of data indicated by the pointer stored in the PTR shown by h in FIG. 3(b), the attribute bit representing the bookmark "☆" ("*" bit shown in FIG. 4) is reset. Next, decrement of the setting number is performed. Specifically, one is subtracted from the setting number of each bookmark "☆" which is greater than the setting number of the bookmark "☆" placed in the indicated data. Then, the setting number of the bookmark "☆" ("SETTING NO.2 in FIG. 4) is cleared (set to zero) in the data attributes section of the indicated data. Moreover, one is subtracted from the value of the register bk_num2 for sorting the number of bookmarks "☆" placed.

FIG. 19 shows an example of the process for searching for bookmark data in the bookmark mode when a block of data is marked with a bookmark.

In step t-1, the data attributes of the data indicated by the pointer stored in the PTR shown by h in FIG. 3(b) are checked.

Next, in step t-2, the value of bk_type (bookmark type storage buffer), shown by k in FIG. 3(b), for storing the type of a bookmark which is desired to be retrieved now, is checked. Then, the user data are checked to find whether the attribute bit representing a bookmark of a type corresponding to the above-mentioned value has been set or reset.

In step t-2, if the attribute bit has been set, the data currently indicated by the PTR is data marked with the bookmark. Therefore, the program moves to step t-3, and "Search OK" is given as the result of this subroutine to the main routine, and the subroutine is completed.

On the other hand, in t-2, if the attribute bit has been reset, the program proceeds to step t-4 so as to search for the next data, and the pointer indicating the data is set in the PTR.

In step t-4, when the next data to be searched for is in a location beyond the end of schedule data stored at the end of the memory, the program moves to step t-5, and "Search Error" is given as the result of this subroutine to the main routine and the subroutine is completed. On the other hand, when the location of data to be searched for is not beyond the end of schedule data stored at the end of the memory, the program returns to step t-1 so as to check the data attributes of data shown by the PTR that indicates the next data.

The phrase "the end of schedule data" mentioned in the explanation of t-4 means the end address of the final data stored in the user memory. Namely, the "end of schedule data" merely means the end address of schedule data in the explanation of this embodiment. The same thing is said in the explanation of w-4 below.

Figure 20:
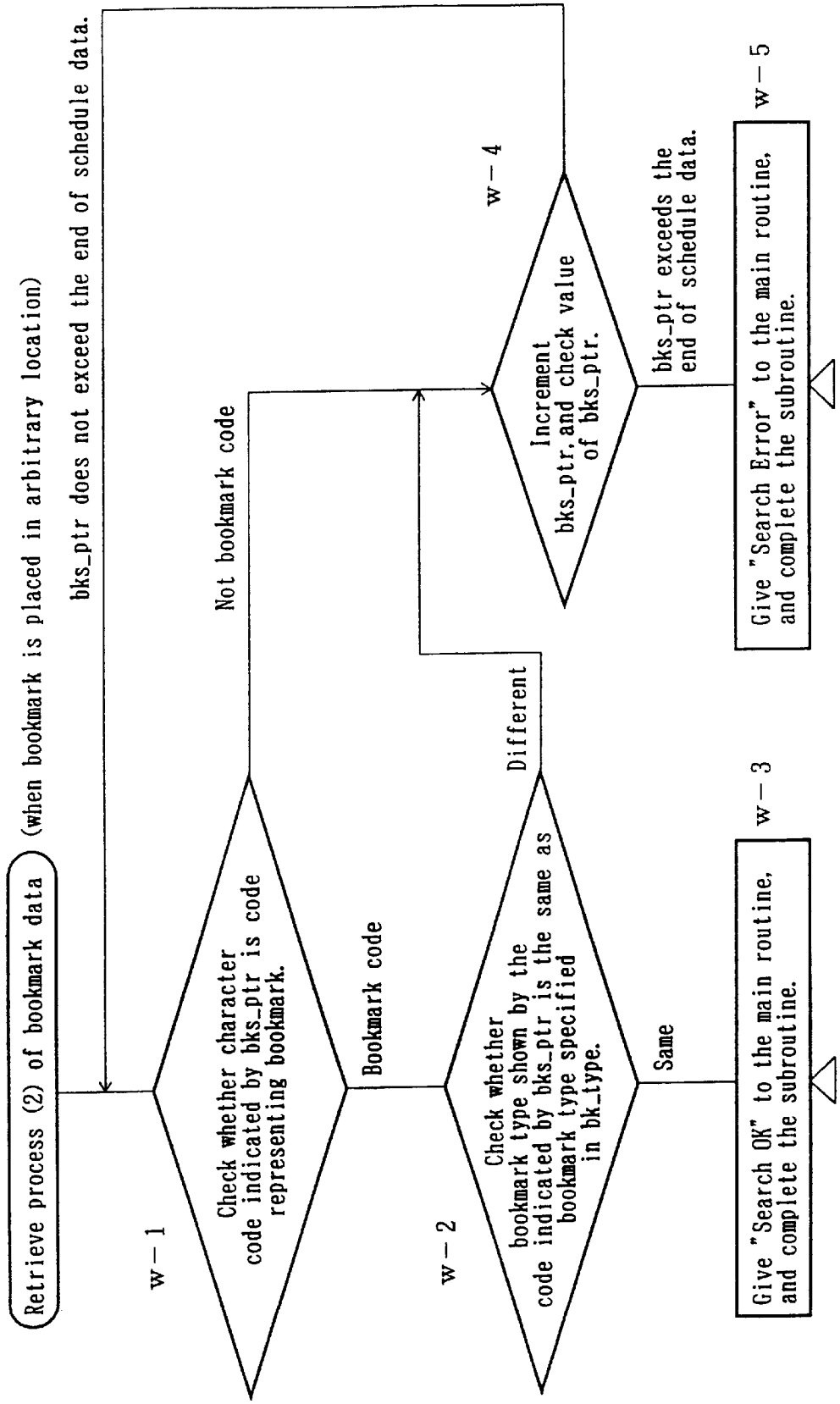
FIG. 20 shows an example of the operation of the portable electronic device of FIG. 1 by a flow chart of a process for retrieving data marked with a bookmark when the bookmark is placed in an arbitrary location of data.

FIG. 20 shows a subroutine for searching for bookmark data in the bookmark mode when a bookmark is placed in an arbitrary location.

In step w-1, it is checked whether a character code indicated by bks_ptr (bookmark code searching pointer) shown by 1 in FIG. 3(b) is a code representing a bookmark.

In step w-1, if the character code is the code representing a bookmark, the program moves to w-2. Then, it is checked whether the code of the bookmark indicated by bks_ptr coincides with the type indicated by bks_type (shown by k of FIG. 3(b)) of a bookmark which is desired to be searched for.

If they coincide with each other, the program moves to step w-3, and "Search OK" is given as the result of this subroutine to the main routine and the subroutine is completed.

On the other hand, if they do not coincide with each other, the program moves to w-4, and increment of bks_ptr is performed to see a code one character ahead. Then, the code indicated by the bks_ptr is checked.

In w-4, if the data (character code) to be searched for is beyond the end of schedule data stored at the end of the memory, the program moves to step w-5, and "Search Error" is given as the result of this subroutine to the main routine and the subroutine is completed. If the location of the data to be searched for is not beyond the end of schedule data, the program returns to w-1 so as to check the code indicated by the bks_ptr.

FIG. 21 shows an example of a process corresponding to the operation of the BOOKMARK mode key $2c_1$ when a block of data is marked with a bookmark, instead of an arbitrary location of data.

In step u-1, first, the menu shown in step 20 (bookmark mode) of FIG. 10 is displayed on the screen. Here, when "1" is selected, the program moves to step u-9, and then it is checked whether the bk_num1 is zero. If zero, it is found that no bookmark has been set, and the program proceeds to step u-8. Then, a message, for example, "BOOKMARK DATA NOT FOUND!" is displayed, and the program returns to the previous state (as shown in step 25 of FIG. 11).

In u-9, if the bk_num1 does not indicate zero, the program moves to step u-2. Then, the value representing the symbol "★" is set in the bk_type (k in FIG. 3(b)) which is the buffer for storing the type of a bookmark that is desired to be searched for and displayed, and the program moves to step u-4.

On the other hand, when "2" is selected in step u-1, the program proceeds to step u-10, and it is checked whether the bk_num2 is zero. If zero, no bookmarks have been set. Therefore, the program moves to step u-8. Then, a message, for example, "BOOKMARK DATA NOT FOUND" is displayed, and the program returns to the previous state (as shown in step 25 of FIG. 11).

In step u-10, if the bk_num2 does not indicate zero, the program moves to step u-3. Then, the value representing the symbol "☆" is set in the bk_type (k in FIG. 3(b)) which is the buffer for storing the type of a bookmark which is desired to be searched for and displayed, and the program moves to step u-4.

In step u-4, the leading pointer of phone book ① that is the leading data of the user data is set in the PTR shown by h. Of course, the leading pointer of the phone book ① is the leading address of the leading data stored in the user memory. For instance, in this embodiment, the leading address is an address of the phone book ①. The same thing can be said for step x-4 shown in FIG. 22.

Next, in step u-5, subroutine ① (FIG. 19) for retrieving bookmark data is called. If "Search OK" is given as the result of this subroutine to the main routine, the program moves to step u-6.

In step u-6, the data indicated by the PTR shown by h is displayed (for example, as shown in step 21 of FIG. 11). In this display, the setting number of the bookmark of the type indicated by the bk type shown by k and the mode of the data indicated by the PTR are additionally displayed.

In step u-6, when the data retrieve key 2e (search key) is pressed, the program returns to step u-5, and search for the next data continues to be performed. On the other hand, when a key other than the data retrieve key 2e (search key) is pressed, the program moves to step u-7, and processing corresponding to the pressed key is carried out.

In step u-5, when there is no bookmark data to be searched for, the program proceeds to step u-11, and a message indicating that no bookmark was found is displayed.

FIG. 22 shows an example of a process corresponding to the operation of the BOOKMARK mode key $2c_1$ when a bookmark is placed in an arbitrary location.

In step x-1, first, the menu shown in step 20 (bookmark mode) of FIG. 10 is displayed on the screen. Here, when "1"

is selected, the program moves to step x-9, and then it is checked whether the bk_num1 is zero. If the bk_num1 is zero, it is found that no bookmarks have been set, and the program proceeds to step x-8. Then, a message indicating that no bookmarks have been set is displayed, and the program returns to the previous state (as shown in step 25 of FIG. 11).

In x-9, if the bk_num1 is not zero, the program moves to step x-2. Then, the value representing the symbol "★" is set in the bk_type (k in FIG. 3(*b*)) that is the buffer for storing the type of a bookmark which is desired to be searched for and displayed, and the program moves to step x-4.

On the other hand, when "2" is selected in step x-1, the program proceeds to step x-10, and it is checked whether the bk_num2 is zero. If the bk_num2 is zero, it is found that no bookmarks have been set. Therefore, the program moves to step x-8. Then, a message indicating that no bookmarks have been set is displayed, and the program returns to the previous state (as shown in step 25 of FIG. 11).

In step x-10, if the bk_num2 is not zero, the program moves to step x-3. Then, the value representing the symbol "☆" is set in the bk_type (k in FIG. 3(*b*)) that is the buffer for storing the type of a bookmark which is desired to be searched for and displayed, and the program moves to step x-4.

In step x-4, the leading pointer of the phone book ① as the leading data of the user data is set as the searching start position in the PTR shown by h.

Next, in step x-5, subroutine ② (FIG. 20) for retrieving bookmark data is called. If "Search OK" is given as the result of this subroutine to the main routine, the program moves to step x-6.

Figure 14:
FIG. 14 is a view for explaining an example of the operation of the portable electronic device following to the operation of FIG. 13, and mainly showing key entries for searching for data marked with the bookmark and corresponding display examples in the display section.

In step x-6, the data indicated by the bks_ptr is displayed so that the position of the bks_ptr comes top of the screen (step 37 in FIG. 14). In this display, the setting number indicated by (bks_ptr+1) and the mode of the data indicated by the bks_ptr are additionally displayed.

In step x-6, when the data retrieve key 2*e* (search key) is pressed, the program returns to step x-5, and search for the next data continues to be performed. On the other hand, when a key other than the data retrieve key 2*e* (search key) is pressed, the program moves to step x-7, and processing corresponding to the pressed key is carried out.

In step x-5, when there is no bookmark data to be searched for, the program proceeds to step x-11, and a message indicating that no bookmark was found is displayed.

FIG. 23 shows an example of a process for retrieving bookmarks in the same sorting order in different modes.

Here, the following description will explain an operation performed in the bookmark mode when a block of data is marked with a bookmark instead of placing a bookmark in an arbitrary location.

First, in step v-1, the leading pointer of the phone book ① data is set in the PTR shown by h in FIG. 3(*b*). Then, the program moves to step v-2.

In step v-2, subroutine ① for retrieving the bookmark data is called. If "Search OK" is given, the program proceeds to step v-3. In step v-3, the value of the PTR is set in the bk_cp1, and the program moves to step v-5. If there is no data to be searched for in step v-2, the program moves to step v-4, and null (a null pointer) is set in the bk_cp1. Then, the program proceeds to step v-5.

In step v-5, the leading pointer of the phone book ② data is set in the PTR. Then, the program moves to step v-6.

In step v-6, subroutine ① for retrieving the bookmark data is called. If "Search OK" is given, the program proceeds to step v-7. In step v-7, the value of the PTR is set in the bk_cp2, and the program moves to step v-9. If there is no data to be searched for in step v-6, the program moves to step v-8, and null (a null pointer) is set in the bk_cp2. Then, the program proceeds to step v-9.

In step v-9, the leading pointer of the phone book ③ data is set in the PTR. Then, the program moves to step v-10.

In step v-10, subroutine ① for retrieving the bookmark data is called. If "Search OK" is given, the program proceeds to step v-11. In step v-11, the value of the PTR is set in the bk_cp3, and the program moves to step v-13. If there is no data to be searched for in step v-10, the program moves to step v-12, and null (a null pointer) is set in the bk_cp3. Then, the program proceeds to step v-13.

In step v-13, it is checked whether all of the bk_cp1, bk_cp2 and bk_cp3 are null, i.e., whether the search for bookmark data has been carried out to the last data in the respective phone book modes ①, ②, and ③.

If the search has done to the last data, the program proceeds to step v-16, and a message indicating that no more bookmark is found is displayed. Then, the process is completed.

In v-13, if the search has not done to the last data in all of the modes, the processing of v-14 is carried out.

In v-14, the names of the data indicated by pointers which are not null among the pointers bk_cp1, bk_cp2 and bk_cp3 are compared. The data having the highest priority for sorting is displayed as the bookmark data. Then, the program proceeds to step v-15.

In v-15, the next data with a bookmark to the pointer used for the display among the bk_cp1, bk_cp2 and bk_cp3 (the bk_cp2 when the displayed data is data of the phone book ② mode) is searched for, and then the pointer to the next data with a bookmark is set in the pointer. In the case when there is no next data with a bookmark (i.e., when each mode comes to an end), null is set. After the processing of v-15, the program returns to the processing of v-13.

FIG. 24 shows an example of a process for deleting only and every data marked with a specific bookmark at a time.

Before executing the routine for deleting every data with a specific bookmark at a time, the value representing the type of a bookmark to be deleted is set in the bk_type shown by k in FIG. 3(*b*) (steps 26, 27 and 28 of FIG. 12).

First, in step y-1, the leading pointer of data of the phone book ① is set in the PTR shown by h in FIG. 3(*b*). Then, the program moves to y-2.

In y-2, the bookmark attribute bit of the user data indicated by the PTR is checked to find whether the attribute bit representing a bookmark specified by the bk_type shown by k in FIG. 3(*b*) has been set or reset. If the attribute bit has been set in y-2, the program moves to step y-3 so as to delete one data indicated by the PTR. Then, the program proceeds to step y-4. On the other hand, if the attribute bit has been reset in y-2, the program moves to step y-4.

In y-4, the next data is searched out, and the pointer to the next data is set in the PTR.

In y-4, if the pointer value of the PTR exceeds the end of the schedule data, all of the data have been checked for deletion processing. Then, the program proceeds to step y-5, and data deletion processing is completed.

In y-4, if the pointer value of the PTR does not exceed the end of the schedule data, the program returns to step y-2, and it is judged whether the next data is to be deleted.

In view of the above described embodiment, the content of a first information processing apparatus with a bookmark function of the present invention is summarized as follows.

In a state in which data is displayed, when a key for setting a bookmark is pressed by a user (in this embodiment, when the SET BOOKMARK key $2f_1$ shown in FIG. 1 is pressed), a bit representing bookmark data is provided in the data attribute section e-3 (shown in FIGS. 3(d) to 3(f)) of the currently displayed data. When the currently displayed data is data without a bookmark, the bit representing bookmark data is set.

On the other hand, when a key for deleting a bookmark is pressed by the user (in this embodiment, when the DELETE BOOKMARK key $2f_2$ shown in FIG. 1 is pressed), if the currently displayed data is data marked with a bookmark, the bit representing bookmark data is reset.

As a memory area for managing the above-mentioned bookmark information, an unused space (spare bit) in the area of the data attributes e-3 can be used in the portable electronic device of this invention. The area of the data attributes e-3 corresponds to an area provided for storing data such as secret data in conventional portable data bank (electronic memo device). With the above-mentioned structure, it is possible to implement the bookmark function of the present invention without newly providing a memory for managing the bookmark information. This structure should be particularly advantageous to devices having limitations on memory available for users, such as portable data bank (electronic memo device). In addition, the bookmark function of this invention can be realized by using the spare bit in the area of header e-1 instead of the spare bit in the area of data attributes e-3.

Japanese publication of unexamined patent application (Tokukaihei) No. 5-101038 mentioned above does not show any consideration for portable electronic devices. Moreover, according to this document, any memory is not used exclusively for managing bookmarks, and any pointer provided for other application and buffer memory are not used for managing bookmarks. Also Japanese publication of unexamined patent application (Tokukaihei) No. 6-231186 does not mention a memory for managing bookmarks. The device disclosed in the above Japanese publication No. 5-101038 requires a bookmark information memory device (1-6), and the device of the No. 6-231186 publication needs a memory means (22) for storing recognized mark information.

When a key for retrieving only bookmarks (BOOKMARK mode key $2c_1$) is pressed, data is searched in sequence from the leading data in the user area shown by b in FIG. 3(b). If the bit representing a bookmark as the data attribute has been set, the data is displayed. Thereafter, when a search key is pressed, only data with a bookmark are searched in the same manner while checking the data attributes.

If no data with a bookmark is found even when the search is performed to the last data, a message indicting that no data with a bookmark was found is displayed, and the program returns to the previous state.

In such an information processing apparatus with a bookmark function (portable electronic device), when retrieving data in the bookmark mode, the mode to which the currently displayed data belongs is additionally displayed with reference the value of the pointer shown by j in FIG. 3(b).

The content of a second information processing apparatus with a bookmark function of the present invention is summarized as follows.

The number of bookmarks placed, shown by i in FIG. 3(b), is displayed always, or when confirming the number of bookmarks placed. Moreover, decrement of the number of bookmarks placed is performed whenever a bookmark is deleted. Meanwhile, when setting a bookmark, if the number of bookmarks placed reaches the upper limit, a warning is given to prohibit registration of any more bookmark. On the other hand, if the number of bookmarks placed is less than the upper limit, increment of the number of bookmarks placed is performed. With this structure, it is possible to implement the function of the second information processing apparatus with the bookmark function of the present invention.

The content of a third information processing apparatus with a bookmark function of the present invention is summarized as follows.

In order to sort data of a plurality of modes according to the same rule, pointers to the displayed data shown by h in FIG. 3(b) are provided in the same number as the number of the plurality of modes. As illustrated in FIG. 23, search for bookmark data is carried out with respect to all of the modes. Thereafter, according to the flow chart shown in FIG. 23, the results of searches in the respective modes are compared to each other, and data are displayed in sequence according to order of priority. With this structure, the function of the third information processing apparatus with the bookmark function of the present invention is implemented.

As described above, an information processing apparatus with a bookmark function of the present invention is characterized by having a plurality of modes and a function of placing a bookmark in arbitrary stored data and retrieving the stored data based on the bookmark, and by displaying the mode to which the retrieved data belongs when retrieving the data.

With this structure, since the mode of the data searched out based on the bookmark is output, it is possible to easily find which mode the searched data belongs, thereby improving the usability of the apparatus.

Moreover, another information processing apparatus with a bookmark function of the present invention is characterized by having a plurality of modes and a function of adding a bookmark in arbitrary stored data and retrieving the stored data based on the bookmark, outputting the setting number of each bookmark, setting the upper limit on the number of bookmarks to be placed, and giving a warning when an attempt to place bookmarks more than the upper limit is made.

With this structure, since the setting number of each bookmark is output, it is possible to confirm the number of bookmarks placed and quickly find the remaining number of bookmarks which can be placed, thereby facilitating judgement in setting bookmarks.

Moreover, since the upper limit is set in respect of the number of bookmarks and a warning is given when an attempt to place bookmarks more than the upper limit is made, it is possible to always search for data with a bookmark from the optimum number of bookmarks, thereby improving the usability of the apparatus.

Furthermore, still another information processing apparatus with a bookmark function of the present invention is characterized by having a plurality of modes and a function of placing a bookmark in arbitrary stored data and retrieving the stored data based on the bookmark, and retrieving and outputting data with the bookmark in all of the plurality of modes according to a predetermined sorting rule.

With this structure, since data with the bookmark are retrieved according to the predetermined sorting rule in the plurality of modes, it is possible to sort data belonging to the plurality of modes according to a unified sorting rule. Thus, a choice is added in respect of the sorting method of data, thereby facilitating sorting of data.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An information processing apparatus with a bookmark function comprising:

memory means;

display means;

input means for selecting a mode in which data is to be processed;

control means for processing data in the mode selected via said input means out of a plurality of modes to store processed data into said memory means, said control means further for placing a bookmark in data, which are stored in said memory means in said plurality of modes, respectively, storing specific information for specifying data marked with the bookmark in said memory means, retrieving the stored data marked with the bookmark based on the specific information as a result of search through accumulated data among said plurality of modes, and displaying the retrieved data on said display means, wherein when the stored data marked with the bookmark is retrieved based on the specific information, said control means displays a mode to which the retrieved data belongs together with the retrieved data on said display means.

2. The information processing apparatus with a bookmark function according to claim 1, wherein said memory means includes a memory area for storing data input by a user, and said control means stores bookmark management information in an unused space of said memory area within an area allocated to data contained in the input data.

3. The information processing apparatus with a bookmark function according to claim 1, wherein said control means places more than one type of bookmarks in the data.

4. The information processing apparatus with a bookmark function according to claim 1, wherein said control means marks a block of data with the bookmark.

5. The information processing apparatus with a bookmark function according to claim 1, wherein said control means places the bookmark in an arbitrary location of each data.

6. The information processing apparatus with a bookmark function according to claim 1, wherein said apparatus is constructed to be portable.

7. An information processing apparatus with a bookmark function comprising:

memory means; and input means for selecting a mode in which data is to be processed;

control means for processing data in the mode selected via said input means out of a plurality of modes to store processed data into said memory means, said control means further for placing a bookmark in data, which are stored in said memory means in said plurality of nodes, respectively, according to an input that instructs placement of the bookmark, storing specific information for specifying data marked with the bookmark in said memory means, retrieving the stored data marked with the bookmark based on the specific information as a result of search through accumulated data among said plurality of modes, and outputting the retrieved data, wherein said control means counts the number of bookmarks placed, sets an upper limit on the number of bookmarks to be placed, and gives a warning when an instruction to place bookmarks more than the upper limit is input.

8. The information processing apparatus with a bookmark function according to claim 7, further comprising display means, wherein said control means displays on said display means the retrieved data and a setting number of the bookmark which was assigned to the bookmark when the bookmark was placed in said data.

9. The information processing apparatus with a bookmark function according to claim 7, wherein said memory means includes a memory area for storing data input by a user, and said control means stores bookmark management information in an unused space of said memory area within an area allocated to data contained in the input data.

10. The information processing apparatus with a bookmark function according to claim 7, wherein said control means places more than one type of bookmarks in the data.

11. The information processing apparatus with a bookmark function according to claim 7, wherein said control means marks a block of data with the bookmark.

12. The information processing apparatus with a bookmark function according to claim 7, wherein said control means places the bookmark in an arbitrary location of each data.

13. The information processing apparatus with a bookmark function according to claim 7, wherein said apparatus is constructed to be portable.

14. An information processing apparatus with a bookmark function comprising:

memory means;

input means for selecting a mode in which data is to be processed; and control means for processing data in the mode selected via said input means out of a plurality of modes to store processed data into said memory means, said control means further for placing a bookmark in data stored in said memory means in said plurality of modes, respectively, storing in said memory means specific information for specifying data marked with the bookmark, retrieving the stored data marked with the bookmark based on the specific information, and outputting the retrieved data, wherein said control means retrieves data marked with the bookmark according to a predetermined sorting rule from all of data stored in the plurality of modes in said memory means, irrespective of mode.

15. The information processing apparatus with a bookmark function according to claim 14, further comprising display means, wherein said control means displays the retrieved data on said display means.

16. The information processing apparatus with a bookmark function according to claim 14, wherein said memory means includes a memory area for storing data input by a user, and said control means stores bookmark management information in an unused space of said memory within an area allocated to data contained in the input data.

17. The information processing apparatus with a bookmark function according to claim 14, wherein said control means places more than one type of bookmarks in the data.

18. The information processing apparatus with a bookmark function according to claim 14, wherein said control means marks a block of data with the bookmark.

19. The information processing apparatus with a bookmark function according to claim 14, wherein said control means places the bookmark in an arbitrary location of each data.

20. The information processing apparatus with a bookmark function according to claim 14, wherein said apparatus is constructed to be portable.

21. A method comprising the steps of:

providing a memory;

providing a display;

selecting, from a plurality of different modes, a mode in which data is to processed;

processing data in the mode selected from the plurality of modes, and storing processed data in the memory;

placing a bookmark in data stored in at least one of said plurality of said modes;

retrieving stored data marked with the bookmark; and displaying the retrieved data on a display together with the mode to which it belongs.

\* \* \* \* \*